United States Patent
Ooi et al.

(10) Patent No.: US 6,829,440 B2
(45) Date of Patent: Dec. 7, 2004

(54) METHOD AND APPARATUS FOR COMPENSATION OF POLARIZATION-MODE DISPERSION

(75) Inventors: Hiroki Ooi, Kawasaki (JP); George Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 667 days.

(21) Appl. No.: 09/793,689

(22) Filed: Feb. 27, 2001

(65) Prior Publication Data

US 2002/0018266 A1 Feb. 14, 2002

(30) Foreign Application Priority Data

Jul. 13, 2000 (JP) ........................................ 2000-213266

(51) Int. Cl.[7] .............................................. H04B 10/18
(52) U.S. Cl. ......................... 398/148; 398/152; 398/81
(58) Field of Search ................................ 398/142, 147, 398/148, 149, 152, 181

(56) References Cited

U.S. PATENT DOCUMENTS

| | | | | |
|---|---|---|---|---|
| 5,930,414 | A | 7/1999 | Fishman et al. ............... | 385/11 |
| 6,490,063 | B1 * | 12/2002 | Imajo .......................... | 398/13 |
| 6,671,464 | B1 * | 12/2003 | Kikuchi ....................... | 398/65 |
| 6,678,431 | B2 * | 1/2004 | Han et al. .................... | 385/11 |

FOREIGN PATENT DOCUMENTS

JP 11-196046 7/1999

OTHER PUBLICATIONS

Hiroki Ooi, et al., "Automatic Polarization–Mode Dispersion Compensation in 40–Gbits/s Transmission", OFC/IOOC '99, Feb. 21–26, 1999, San Diego.

Henning Bulow, "Equalization of Bit Distortion Induced by Polarization Mode Dispersion", Core and ATM Networks NOC '97.

(List continued on next page.)

*Primary Examiner*—Leslie Pascal
(74) *Attorney, Agent, or Firm*—Staas & Halsey LLP

(57) ABSTRACT

An object of the invention is to provide a method and apparatus of PMD compensation, which enable of compensating for polarization-mode dispersion (PMD) occurring in signal light, at high accuracy over a wide range. For this purpose, the PMD compensation apparatus of the invention comprises a polarization control section for setting a branching ratio γ for the optical strength to two polarization-modes for signal light input from a transmission line, a variable PMD compensation section for applying an optical delay difference $\Delta\tau_C$ between the two polarization-modes, a PMD monitor for detecting a frequency $f_1$ component in signal light output from the variable PMD compensation section, a PMD monitor for detecting the strength of a frequency $f_2$ ($<f_1$) component in signal light output from the variable PMD compensation section, and a control circuit for feedback controlling the polarization control section and the variable PMD compensation section so that each monitor strength of the respective PMD monitors becomes within a maximum value convergence range determined in accordance with an indefinite width of the detection sensitivity.

21 Claims, 18 Drawing Sheets

OTHER PUBLICATIONS

T. Takahashi, et al., "Automatic Compensation Technique for Timewise Fluctuating Polarisation Mode Dispersion in In–Line Amplifier Systems", Electronics Letters 1994, vol. 30, No. 4, Feb. 17, 1994.

Fred Heismann, et al., "Automatic Compensation of First–Order Polarization Mode Dispersion in a 10Gb/s Transmission System", ECOC '98, Sep. 20–24, 1998, Madrid, Spain.

D. Sandel, et al., "Automatic Polarisation Mode Dispersion Compensation in 40 Gbit/s Optical Transmission System", Electronic Letters 1998, vol. 34, No. 23.

R. Noe, et al., "Fiber–Based Distributed PMD Compensation At 20 GB/S", ECOC '98, Sep. 20–24, 1998, Madrid, Spain.

C. Glingener, et al., "Polarization Mode Dispersion Compensation at 20 Gb/s wth a Compact Distributed Equalizer in $LiNbO_3$", OFC '99 Post Deadline IOOC PD29 PD29–1≈PD29–3.

W. Shieh, et al., "Dynamic Polarization–mode–dispersion Compensation in WDM Systems", ECOC 2000, p. 41–42.

Ono, et al., "10Gb/s Compensation Field Experiment Over 452 Km Using Principal State Transmission Method," PD44–1~PD44–3.

* cited by examiner $\Delta\tau_T$=0ps $\Delta\tau_T$=16.8ps $\Delta\tau_T$=10.2ps $\Delta\tau_T$=23.4ps
(HORIZONTAL AXIS:10ps/div.)

FIG.22
RELATED ART
NO COMPENSATION	COMPENSATION
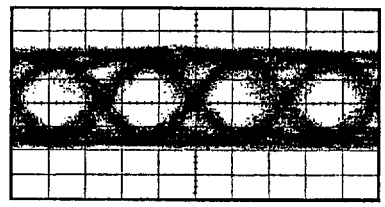 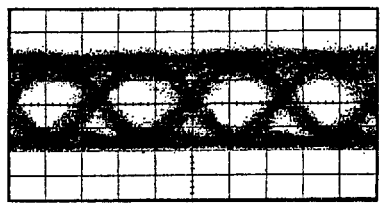
$\Delta\tau_T=0ps$
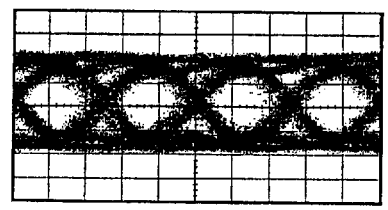 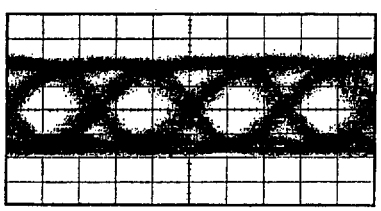
$\Delta\tau_T=6.8ps$
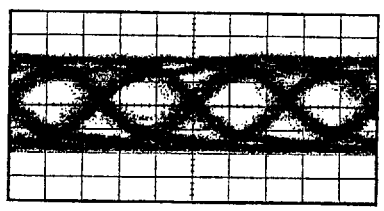 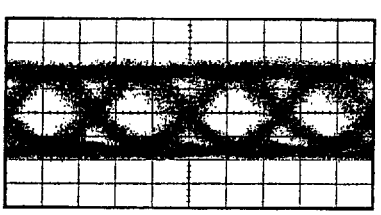
$\Delta\tau_T=10.2ps$
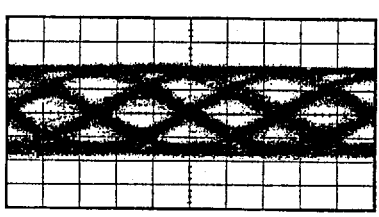 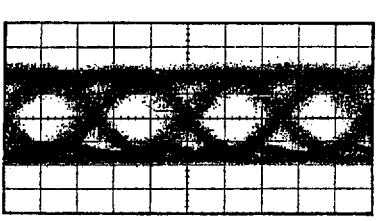
$\Delta\tau_T=16.8ps$
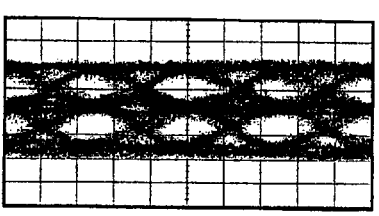 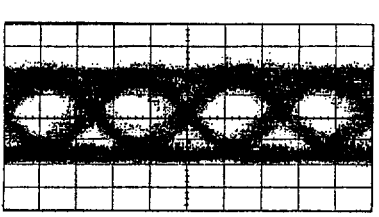
$\Delta\tau_T=23.4ps$

METHOD AND APPARATUS FOR COMPENSATION OF POLARIZATION-MODE DISPERSION

BACKGROUND OF THE INVENTION (1) Field of the Invention

The present invention relates to techniques for compensating for influences on signal light due to polarization-mode dispersion of transmission lines. In particular, the invention relates to a method and apparatus for compensation of polarization-mode dispersion, which detects the strength of a specific frequency component in a baseband spectrum in signal light, to perform compensation of polarization-mode dispersion.

(2) Related Art

Presently, in Japan and overseas, the commercialization of optical transmission systems at transmission speeds of 10 Gb/s (gigabit/second) is advancing. Furthermore, in order to provide communication services of low cost and with high frequency efficiency to meet the rapid increase in transmission capacity demand due to the Internet and the like, there is a requirement to realize ultra high-speed optical transmission systems at transmission speeds of for example 40 Gb/s.

However, in such ultra high-speed optical transmission systems, the transmission waveform of the signal light deteriorates due to the influence of polarization-mode dispersion (referred to hereunder as PMD) and the like which occurs in the transmission line. Therefore, there is a problem that the transmission distance of the signal light is limited. This PMD is phenomenon that occurs due to a difference in propagation delay times of polarization components in the signal light (for example two mode light such as TE mode and TM mode), being inevitable phenomena for all optical fibers.

Consequently, in order to realize long distance optical transmission at ultra high-speed, application of PMD compensation technique is essential. Furthermore, since PMD also fluctuates with time due to changes in the transmission line environment, such as temperature or stress, automatic PMD compensation techniques are necessary for monitoring the condition of the PMD during system operation, and performing feedback control.

As a heretofore automatic PMD compensation technique, there is reported for example a compensation method in optical regions (refer, for example, to T. Takahashi et al., Electronics Letters Vol. 30, pp. 348–349, 1994, or F. Heismann et al., ECOC '98 Technical Digest, pp. 529–530, or Japanese Unexamined Patent Publication No. 11-196046) and a compensation method in electrical stages (refer, for example, to H. Bülow, NOC '97 Technical Digest, pp. 57–72).

Furthermore, the present inventors have, from the view point of simple configuration, and independence from modulation methods or other waveform deterioration factors (wavelength dispersion, non-linear effects), and high-speed benefits, proposed an automatic PMD compensation technique which adopts a compensation method in optical regions (refer, for example, to Japanese Patent Application No. 11-515959, or H. Ooi et al., OFC '99, Technical Digest WE5 pp. 86–88, 1999). This compensation technique is one which adopts a PMD monitor method of a simple configuration not requiring a large scale measuring instrument, to detect the strength of a specific frequency component in a baseband spectrum after transmission (for example, a strength of a 20 GHz component in a 40 Gb/s signal light), and then feedback controls on a compensation amount so that the detection strength becomes a relative maximum. By applying this compensation technique, the transmission distance of the signal light is extended by at least four times.

However, in such a compensation technique, there is a problem in that the upper limit of the compensatable PMD is restricted to one time slot of the transmission light. That is to say, as shown in FIG. 12, the strength of the specific frequency component changes with respect to an optical delay amount $\Delta\tau_T$ (hereunder, PMD amount $\Delta\tau_T$) between polarization-modes, due to the PMD in the transmission line, and when the PMD amount $\Delta\tau_T$ becomes the one time slot of the transmission light (for example 25 ps in the case of 40 Gb/s signal light), the strength of the specific frequency component becomes zero (or relative minimum). Therefore, in the case where the PMD amount $\Delta\tau_T$ exceeds the one time slot, when the compensation amount is feedback controlled so that the strength of the specific frequency component becomes relative maximum, the PMD amount $\Delta\tau_T$ after control increases, so that deterioration of the transmission light waveform becomes large.

With respect to this problem, as a technique for extending the range where PMD compensation is possible, a method has been proposed where for example a frequency B/2 Hz component, a frequency B/4 Hz component and a frequency B/8 Hz component in a baseband spectrum in a transmission light signal at transmission speed B b/s are extracted by a band pass filter (BPF), and the various strength are detected (refer, for example, to D. Sandel et al., Electronics Letters Vol. 34, pp. 2258–2259, 1998).

FIG. 13 is a view for explaining the aforementioned PMD compensation technique. The horizontal axis shows the value ($\Delta\tau_T/T$) obtained by standardizing the PMD amount $\Delta\tau_T$ by one time slot T of the transmission light, while the vertical axis shows the strength of the frequency component extracted by each BPF. Here, the curve shown by (BPF 0.5/T) represents the strength of the B/2 Hz component, the curve shown by (BPF 0.25/T) represents the strength of the B/4 Hz component, and the curve shown by (BPF 0.125/T) represents the strength of the B/8 Hz component. Moreover, the curve shown by LPF represents the strength of the B/8 Hz component extracted by a low pass filter (LPF).

As shown in FIG. 13, the lower the frequency extracted by the BPF, the higher the PMD amount $\Delta\tau_T$ at which the strength of each component becomes zero. Therefore, the range where compensation is possible is extended. However, in the region where the PMD amount $\Delta\tau_T$ is small, the change in the detection strength (monitor strength) becomes small (each curve approaches a flat). Therefore, in the case where the PMD compensation amount is feedback controlled so that the monitor strength becomes relative maximum, convergence of the feedback control becomes poor. Furthermore, since there is an indefinite width in the sensitivity of the monitor system, there is also the possibility of time-wise unstable control. Therefore, with the aforementioned PMD compensation technique, three PMD monitors for detecting the strength of each frequency component are sequentially switched. With regards to the switching of the PMD monitors, the threshold values Th1, Th2 for the monitor strength are set beforehand. For example, in the case where the monitor strength increases, when the detection value (curve BPF 0.125/T) of the PMD monitor which detects the strength of the B/8 Hz component, increases up to the threshold value Th1 at the top of FIG. 13, the monitor is switched to the PMD monitor for detecting the strength of the B/4 Hz component. After this, when the detection value (the curve BPF 0.25/T) of this PMD monitor increases to the threshold value Th1, the monitor is switched to the PMD monitor for detecting the strength of B/2 Hz component. Furthermore, for example, in the case where the monitor strength reduces, the monitors are sequentially switched based on the threshold value Th2 at the bottom of FIG. 13, from the PMD monitor for detecting the strength of the B/2 Hz component, to the PMD monitor for detecting the strength of the B/4 Hz component, and then to the PMD monitor for detecting the strength of the B/8 Hz component.

In this way, by controlling so that the plurality of PMD monitors are sequentially switched in accordance with the threshold values Th1 and Th2 previously set with respect to the monitor strength, the range where PMD compensation is possible can be increased to one time slot or more.

However, with the abovementioned conventional PMD compensation technique which controls the switching of the plurality of PMD monitors, absolute values are used for the previously set threshold values for switching the PMD monitors. Therefore, there is the problem in that it is difficult to perform PMD compensation at a high accuracy. That is to say, it is known that the strength of each frequency component detected by the respective PMD monitors fluctuates in accordance with for example wavelength dispersion due to temperature fluctuations or the like, or time-wise changes of the parameters of the branching ratio etc. of the optical strength between polarization-modes, other than with PMD of the transmission line. If the threshold value which becomes the reference for the switching control of the PMD monitor, is previously set using the absolute value rather than the relative value, the setting of the threshold value becomes inappropriate with respect to strength changes due to factors other than PMD as mentioned above, and realization of highly accurate PMD compensation is difficult.

Furthermore, with the conventional compensation technique using a plurality of PMD monitors, there is the restriction that the frequency components for strength detection must be specific frequencies such as ½ times, ¼ times, or ⅛ times of the transmission speed B of the signal light. This restriction makes application to a system where the transmission speed of the signal light changes difficult, and also has the disadvantage that, in order to further widen the compensation range, a large number of frequency components must be monitored.

SUMMARY OF THE INVENTION

The present invention is directed to the aforementioned points, with the object of providing a method and apparatus for compensation of polarization-mode dispersion, which can compensate for polarization-mode dispersion (PMD) occurring in signal light, at high accuracy over a wide range.

In order to achieve the above object, the PMD compensation method according to the present invention first compensates for PMD occurring in signal light input via a transmission line. Then, a plurality of specific frequency components in a baseband spectrum in the post compensation signal light is extracted, and thereafter, the strength of each of the specific frequency components is respectively detected. After this, a PMD compensation condition is feedback controlled so that the strength of all of the detected frequency components are within a maximum value convergence range determined in accordance with an indefinite width of the detection sensitivity. Furthermore, at the time of feedback controlling the PMD compensation condition, switching of the strength of the specific frequency components used in feedback control of the PMD compensation condition may be sequentially performed so that, after the strength of a specific frequency component on a relatively low frequency side comes within the maximum value convergence range, the strength of a specific frequency component on a relatively high frequency side comes within the maximum value convergence range.

With such a PMD compensation method, by controlling the PMD compensation condition so that the strength of the plurality of specific frequency components converge on the respective maximum values, feedback control accurately following the change in the PMD amount of the signal light becomes possible. Furthermore, by sequentially switching the strength of the specific frequency component used in the feedback control from the low frequency side to the high frequency side, the switching of PMD monitors is performed on the basis of the strength of maximum value convergence condition as the base rather than on the basis of the absolute threshold value as heretofore. Therefore, high accuracy PMD compensation can be realized.

The PMD compensation apparatus according to the present invention for compensating for influences on signal light due to PMD of a transmission line, comprises: a polarization-mode dispersion compensation section for compensating for PMD occurring in signal light input via a transmission line; a specific frequency component extraction section for extracting a plurality of specific frequency components in a baseband spectrum in signal light output from the polarization-mode dispersion compensation section; a strength detection section for respectively detecting the strength of each of the specific frequency components extracted by the specific frequency component extraction section; and a compensation condition control section for feedback controlling a PMD compensation condition in the polarization-mode dispersion compensation section so that the strength of all of the specific frequency components detected by the strength detection section are within a maximum value convergence range determined in accordance with an indefinite width of the detection sensitivity. Furthermore, the aforementioned compensation condition control section may sequentially perform switching of the strength of the specific frequency components used in feedback control of the PMD compensation condition in the polarization-mode dispersion compensation section so that, after the strength of a specific frequency component on a relatively low frequency side comes within the maximum value convergence range, the strength of a specific frequency component on a relatively high frequency side comes within the maximum value convergence range.

With such a construction, in the signal light compensated by the polarization-mode dispersion compensation section, the strength of the plurality of specific frequency components are detected by the specific frequency component extraction section and the strength detection section. In the compensation condition control section, control of the PMD compensation condition in the polarization-mode dispersion compensation section is performed using the detected strength of the respective specific frequency components, so that each of the strength converges on the maximum value. As a result, feedback control accurately following changes in the PMD value of the light signal becomes possible. Furthermore, in the compensation condition control section, by performing control for sequentially switching the strength of the specific frequency component used in the feedback control from the low frequency side to the high frequency side, the switching of PMD monitors is performed on the basis of the strength of the maximum value convergence condition rather than on the basis of the absolute threshold value as heretofore. Therefore, high accuracy PMD compensation can be realized.

Furthermore, the abovementioned PMD compensation apparatus, as a specific construction for the specific frequency component extraction section, may have a band pass filter having a transmission center frequency corresponding to the specific frequency component, to extract the specific frequency component using this band pass filter. Alternatively, this may have a low pass filter having a cutoff frequency corresponding to the specific frequency component, to extract the specific frequency component using this low pass filter.

According to such a specific construction, the plurality of specific frequency components in the baseband spectrum in the signal light, are extracted by the band pass filter or the low pass filter. In particular, in the case where the specific frequency components are extracted using the low pass filter, a value can be obtained for where the strength of the frequency components over a wide range are integrated. Therefore, a more stabilized PMD compensation can be realized.

Furthermore, the polarization-mode dispersion compensation section of the aforementioned PMD compensation apparatus may have a polarization control section for determining a branching ratio for the optical strength to two polarization-modes for the signal light, and an optical delay section for applying an optical delay difference between the two polarization-modes, so that a polarization-mode dispersion compensation amount may be set corresponding to a combination of the branching ratio of the polarization control section and the optical delay difference of the optical delay section.

With such a construction, the polarization condition of the signal light input via the transmission line is adjusted by the polarization control section, so that the branching ratio for the optical strength to the two polarization-modes of the signal light is set, and also the signal light passes through the optical delay section, so that an optical delay difference is applied between the two polarization-modes. Thus, the PMD compensation amount is set to a required value.

Furthermore, as a specific construction of the PMD compensation apparatus, the polarization-mode dispersion compensation section may have a variable optical delay element capable of changing an optical delay difference and a wave plate which changes the polarization direction of the input light to the variable optical delay element, and the compensation condition control device may feedback control at least one of an optical delay amount of the variable optical delay element and a position of the wave plate. Alternatively, the polarization-mode dispersion compensation section may have a plurality of polarization-mode dispersion compensation units connected in series, and each of the polarization-mode dispersion compensation units may contain a fixed optical delay element which applies a previously set optical delay difference, and a wave plate which changes the polarization direction of the input light to the fixed optical delay element, and the compensation amount control section may respectively feedback control a position of the wave plate of each of the respective polarization-mode dispersion compensation units.

The PMD compensation apparatus according to the present invention as described above can be applied to various optical transmission systems. In this case, the polarization-mode dispersion compensation apparatus is provided along a transmission line connecting between an optical sender and an optical receiver. With such an optical transmission system, since the PMD of the signal light propagated through the transmission line is reliably compensated for over a wide range, high-speed signal light can be transmitted over a long distance.

Other objects, features and advantages of the present invention will become apparent from the following description of embodiments given in conjunction with the appended drawings.

BRIEF DESCRIPTION OF THE DRAWINGS

FIG. 22 is a diagram showing transmission light waveforms with respect to optical delay differences $\Delta\tau_T$ measured using the experimental system of FIG. 20.

DETAILED DESCRIPTION OF THE INVENTION

Hereunder is a description of embodiments of the present invention based on the drawings.

At first, since it is thought to be useful to understand the technique for compensating for polarization-mode dispersion according to the present invention, a description is given concerning transmission light waveform deterioration due to PMD. Here, a summary is given of transmission light waveform deterioration due to PMD using experimental results performed for example in a 40 Gb/s optical transmission system. Since these experimental results are reported in H. Ooi et al., OFC '99, Technical Digest WE5 pp. 86–88, 1999, this document should be referred to for detailed contents.

Figure 14:
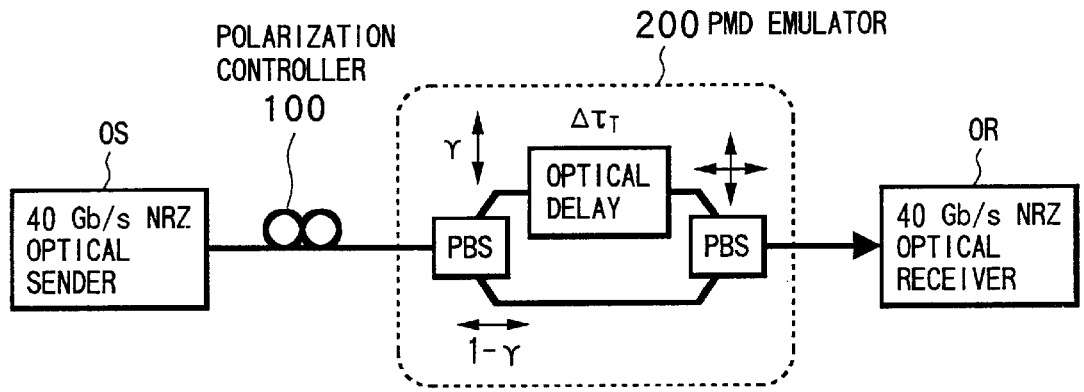
FIG. 14 shows the outline of an experimental system for measuring transmission light waveform deterioration due to PMD.

FIG. 14 is a diagram showing an outline of an experimental system for measuring transmission light waveform deterioration due to PMD.

With the experimental system of FIG. 14, with respect to NRZ (Non-Return-to-Zero) signal light of transmission speed 40 Gb/s sent from an optical sender OS, a branching ratio $\gamma$ ($0 \leq \gamma \leq 1$) of the optical strength between respective polarization-modes is changed in a polarization controller 100. Furthermore, PMD is added by a PMD emulator 200 and then demodulated in an optical receiver OR. Here, the PMD emulator 200 is for simulating PMD which occurs in the transmission line, being a standard device which applies an optical delay difference $\Delta\tau_T$ between polarization-modes which are separated and made orthogonal by polarization beam splitters (PBS).

Figure 15:
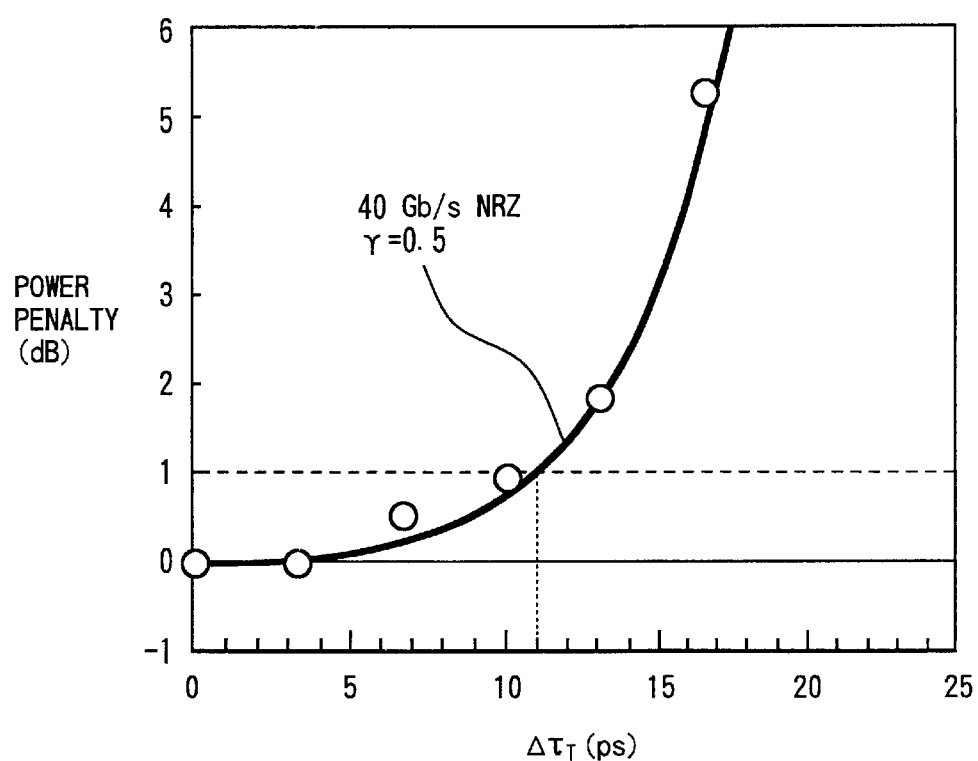
FIG. 15 is a diagram showing power penalty when optical delay difference $\Delta\tau_T$ is changed in the experimental system of FIG. 14.
Figure 16:
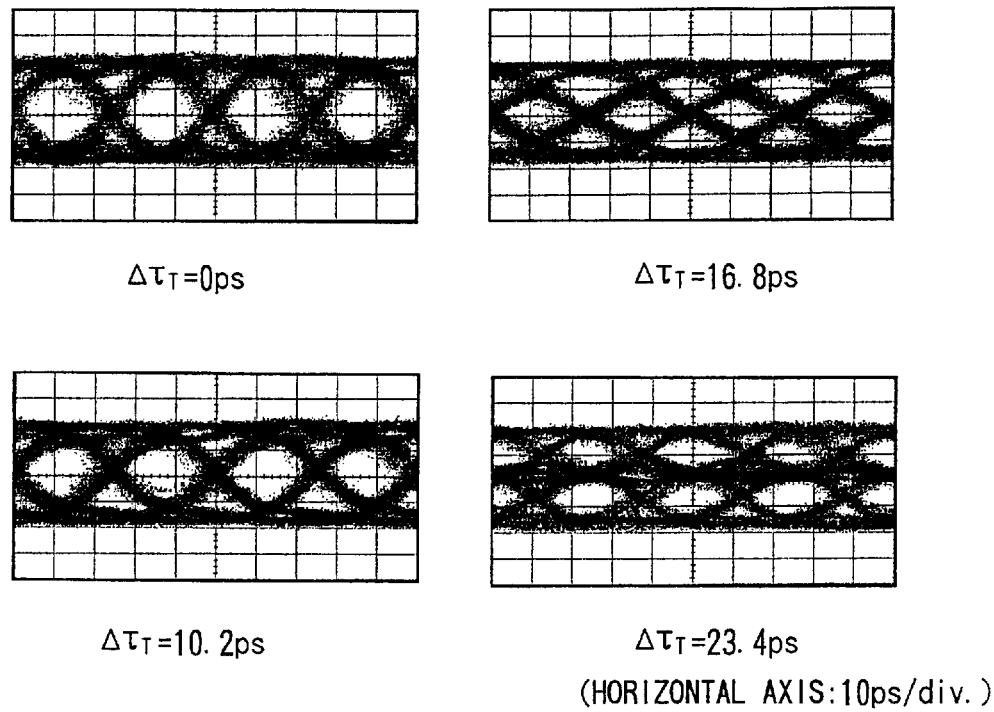
FIG. 16 is a diagram showing changes in transmission light waveform for the case of FIG. 15.

FIG. 15 shows power penalty (reception sensitivity deterioration) for when the optical delay difference $\Delta\tau_T$ is changed. Moreover, FIG. 16 shows changes in the transmission light waveform for the case of FIG. 15. Here, so that the deterioration in transmission light waveform becomes a maximum, the branching ratio $\gamma$ of the optical strength is set to 0.5 in the polarization controller 100.

As shown in the respective figures, the larger the optical delay difference $\Delta\tau_T$ by the PMD emulator 200, that is, the greater the increase in the PMD occurring in the transmission line, the more notable the deterioration in the transmission light waveform. For example, in the case that 1 dB or less is set to be a reference for where transmission is possible with a power penalty after transmission, the PMD proof stress (allowable PMD value) becomes approximately 11 ps (FIG. 15).

If this value of the power penalty is considered, then for relatively old existing fibers, there are those considered to have a large PMD value which exceeds 0.5~2 ps/km$^{1/2}$ per unit length, and when calculated from the aforesaid PMD proof stress, the transmission distance at 40 Gb/s is limited to around 3~50 km. This is assuming the worst PMD value is three times the average value (allowable value). In such an existing transmission line environment, in order to realize ultra high-speed long distance optical transmission, application of PMD compensation techniques is essential. Furthermore, since the PMD of the transmission line fluctuates time-wise due to changes in the transmission line environment, such as temperature or stress, automatic PMD compensation techniques are necessary for monitoring the condition of the PMD during system operation, and performing feedback control.

Therefore, the present inventors, as mentioned above, have proposed an automatic PMD compensation technique which monitors the 20 GHz component strength in a reception baseband signal, for example for a 40 Gb/s optical signal, and feedback controls a PMD compensator based on the monitor strength (refer, for example, to Japanese Patent Application No. 11-515959, or H. Ooi et al., OFC '99, Technical Digest WE5 pp. 86–88, 1999). Since this compensation technique is a technique as the basis for PMD compensation according to the present invention, this will be specifically explained here.

Figure 17:
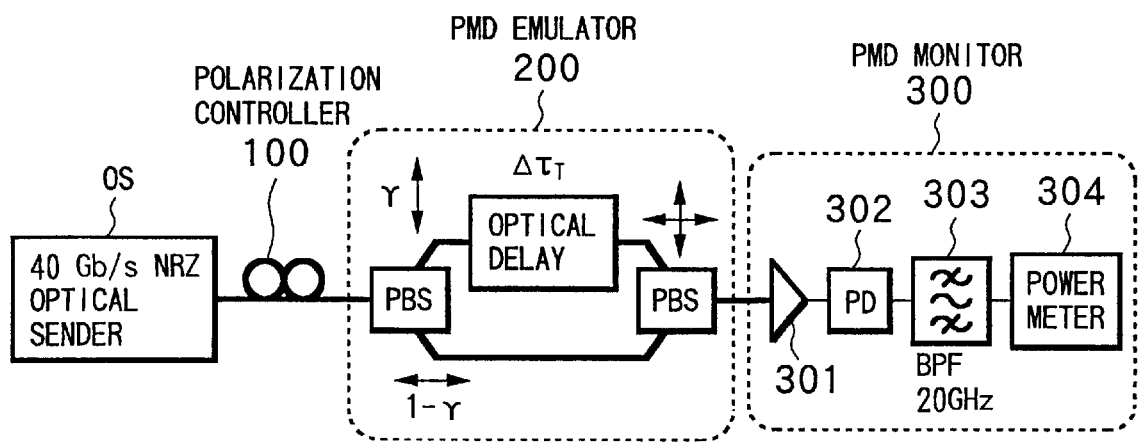
FIG. 17 is a diagram showing an example of a PMD monitor system used in known PMD compensation technique.

FIG. 17 shows an example of a PMD monitor system to be used in this compensation technique. Here, also an NRZ signal light of transmission speed 40 Gb/s is transmitted.

With the PMD monitor system of FIG. 17, with respect to the NRZ signal light of 40 Gb/s generated by an optical sender OS, the branching ratio $\gamma$ of the optical strength between respective polarization-modes is changed by a polarization controller 100, an optical delay difference $\Delta\tau_T$ is applied by a PMD emulator 200, and the signal light is sent to a PMD monitor 300 at the receiving end. In this PMD monitor 300, for example, signal light which has been amplified by an optical preamplifier 301 to a required level is converted to an electrical signal by a photodetector (PD) 302, 20 GHz component is extracted by a narrow-band band pass filter (BPF) 303, and the strength of the 20 GHz component is detected by a power meter 304.

Figure 18:
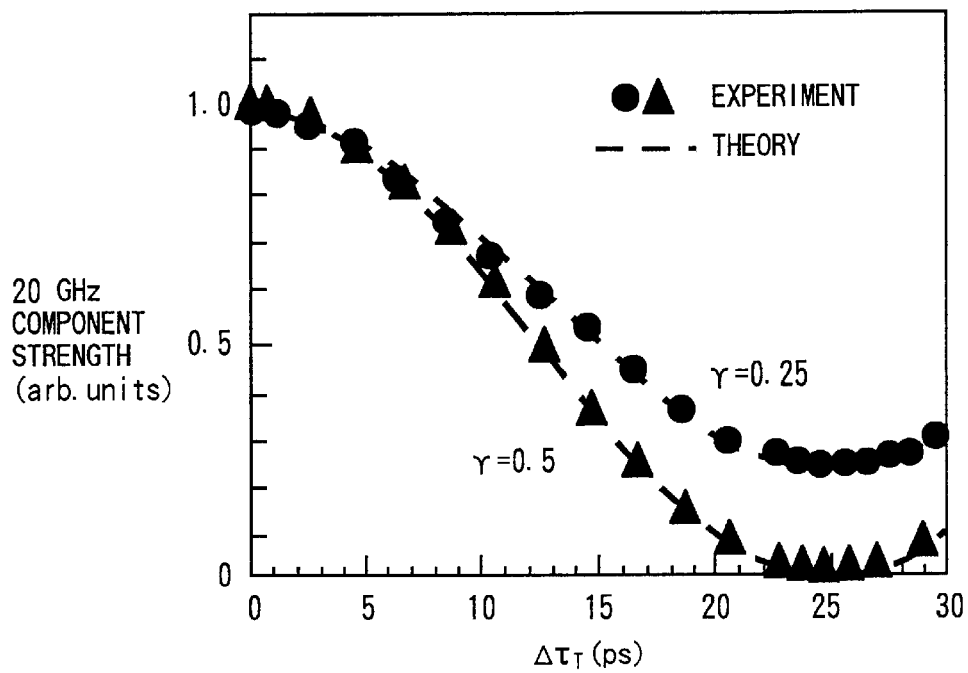
FIG. 18 is a diagram showing $\Delta\tau_T$ dependence for 20 GHz component strength measured using the PMD monitor system of FIG. 17.
Figure 19:
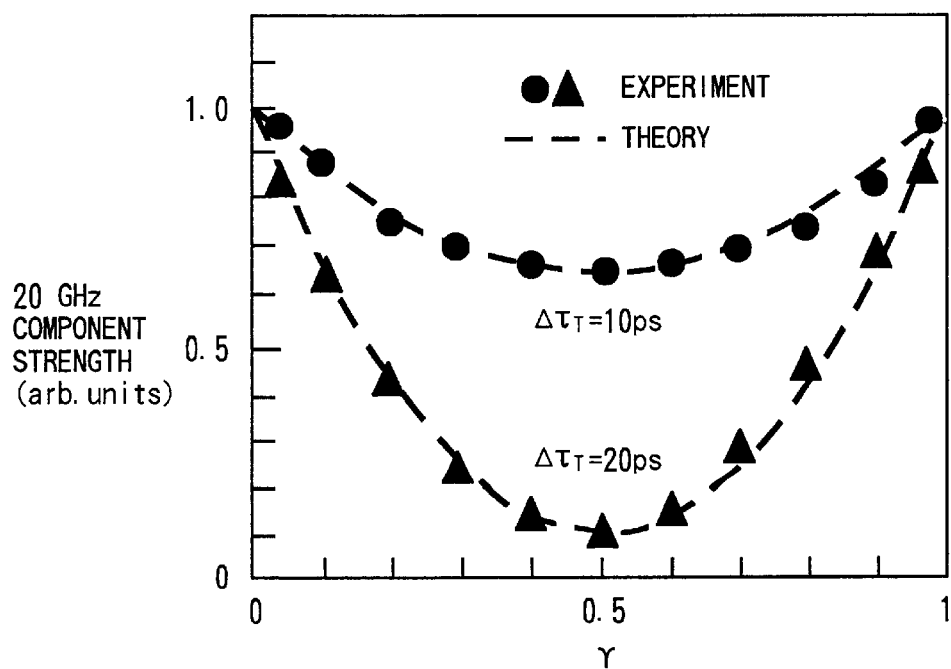
FIG. 19 is a diagram showing $\gamma$ dependence for 20 GHz component strength measured using the PMD monitor system of FIG. 17.

FIG. 18 shows $\Delta\tau_T$ dependence for 20 GHz component strength which have been respectively set and measured at optical strength branching ratios of $\gamma=0.5$ and 0.25 using the PMD monitor system of FIG. 17. Furthermore, FIG. 19 shows $\gamma$ dependence for 20 GHz component strength which have been respectively set and measured at optical delay differences of $\Delta\tau_T=10$ ps and 20 ps.

As shown in FIG. 18, it is seen that the 20 GHz component strength is a maximum when the optical delay differential $\Delta\tau_T=0$, and simply decreases with an increase of $\Delta\tau_T$ up to 25 ps. Furthermore, as shown in FIG. 19, it is seen that the 20 GHz component strength becomes a minimum at $\gamma=0.5$ where the waveform deterioration due to PMD becomes worst. The actual measurement values for these 20 GHz component strength agree well with the generally known theoretical formula for K ($f_e=20$ GHz)=1–4 $\gamma$ (1-$\gamma$) $\sin^2 (\pi f_e \Delta\tau_T)$. From this result, it can be seen that waveform deterioration can be compensated for by feedback controlling the PMD compensation amount so that the 20 GHz component strength becomes a maximum.

Figure 20:
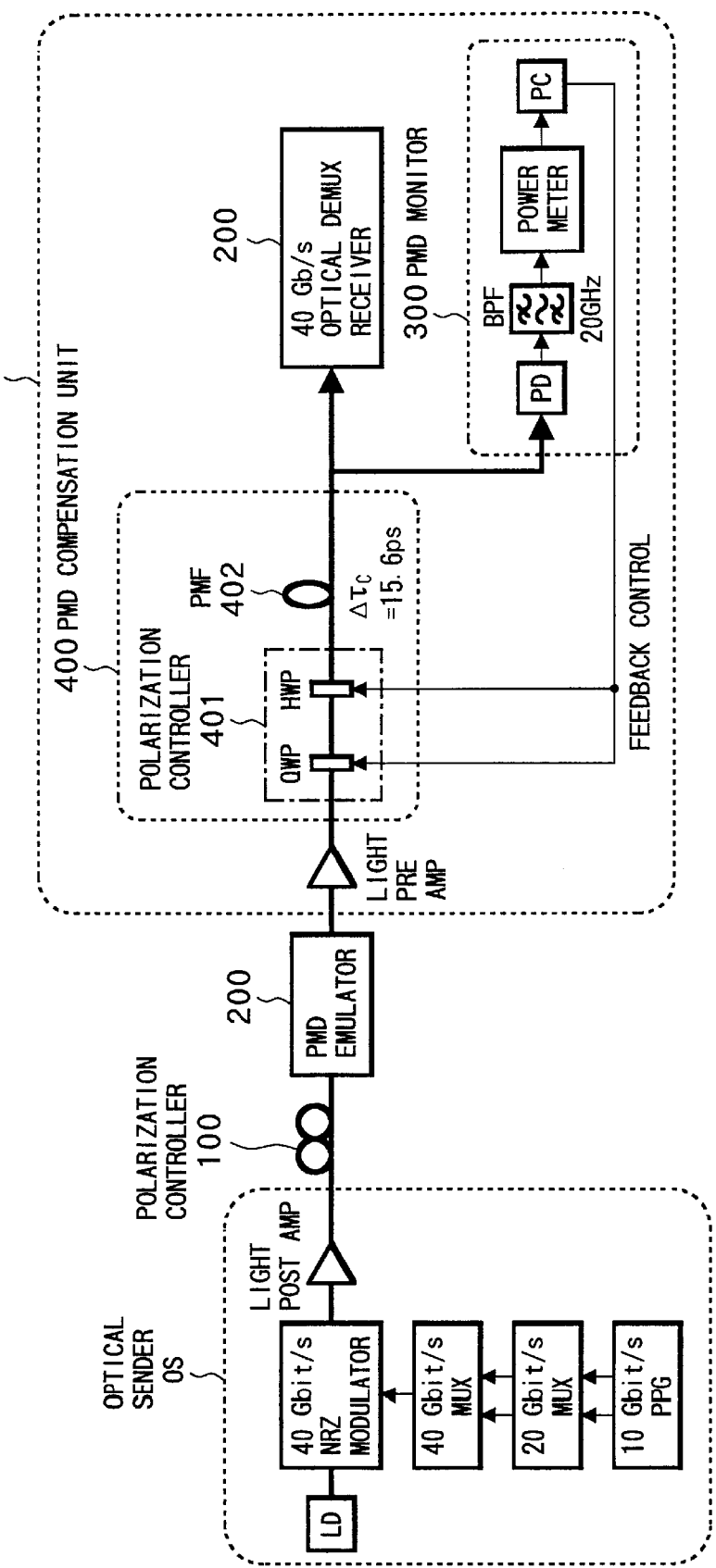
FIG. 20 is a diagram showing an experimental system for where the known PMD compensation technique is applied to a 40 Gb/s optical transmission system.

FIG. 20 shows an experimental system for where the aforementioned compensation technique is applied to a 40 Gb/s optical transmission system. The configuration of this experimental system is the same as for that disclosed in the aforementioned H. Ooi et al., OFC '99, Technical Digest WE5 pp. 86–88, 1999.

With the experimental system shown in FIG. 20, for a PMD compensation unit 400 for compensating for transmission line PMD (here optical delay difference $\Delta\tau_T$ is given by a PMD emulator 200), a polarization controller 401 and a polarization maintaining fiber (hereunder referred to as a PMF) 402 are used. In the PMF 402, an optical delay difference $\Delta\tau_C$ is applied between the polarization-modes. In a PMD monitor 300 connected to an output terminal of the PMD compensation unit 400, strength information of the detected 20 GHz component is recorded in a personal computer (PC) via an A/D converter (not shown in the figure), and by means of software processing by this computer, a $\lambda/4$ wave plate (QWP) and a $\lambda/2$ wave plate (HWP) inside the polarization controller 401 are feedback controlled so that the strength of the 20 GHz component becomes a maximum.

Figure 21:
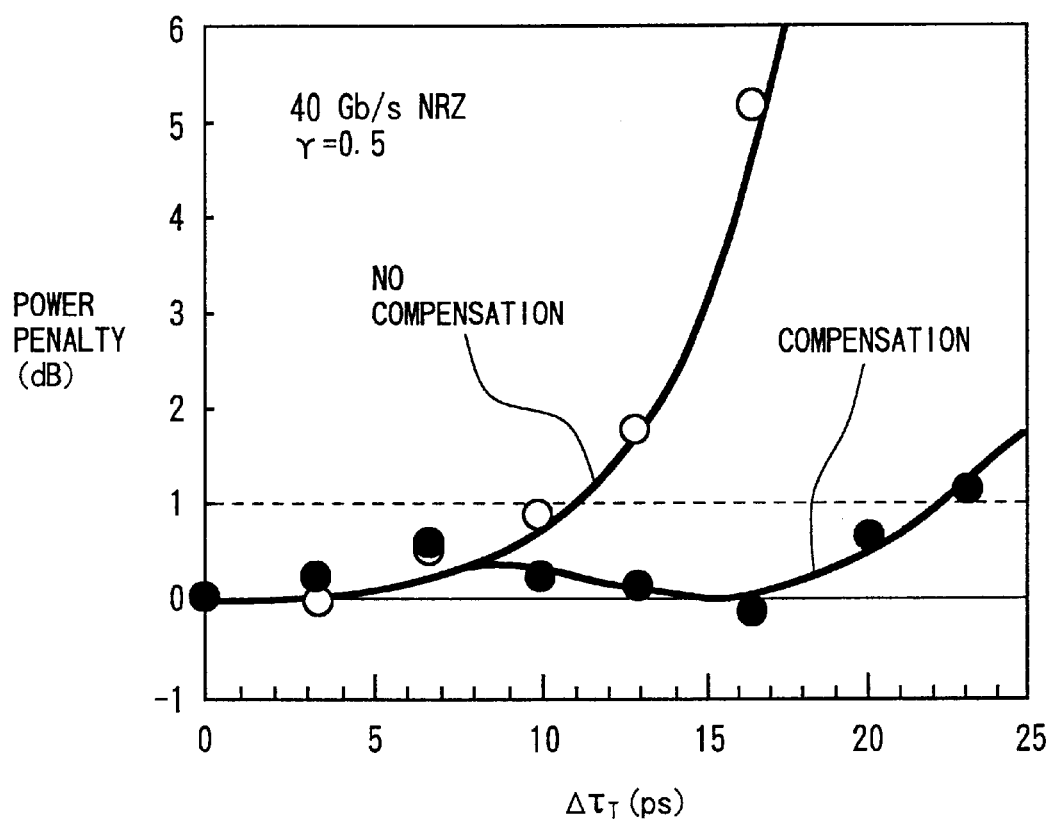
FIG. 21 is a diagram showing power penalty with respect to optical delay difference $\Delta\tau_T$ measured using the experimental system of FIG. 20.

FIG. 21 and FIG. 22 show power penalty and transmission light waveform with respect to optical delay difference $\Delta\tau_T$ corresponding to PMD of the transmission line, with both measured for the case where PMD compensation is performed using the aforementioned experimental system of FIG. 20, and for the case where PMD compensation is not performed. The branching ratio $\gamma$ of the optical strength between the polarization-modes is set to 0.5 where waveform deterioration due to PMD becomes worst.

As shown in the respective figures, it is seen that by feedback controlling the polarization controller 401 based on the strength information of the 20 GHz component, and then performing PMD compensation, the transmission characteristics are improved. More specifically, as in FIG. 21, it is seen that the value of the PMD proof stress where the power penalty becomes 1 dB or less is approximately 11 ps for the case of no PMD compensation, however this is increased to approximately 23 ps by performing PMD compensation. Since the PMD value which occurs in actual transmission line fiber is proportional to the square root of the transmission distance, an increase in PMD proof stress by two or more times corresponds to an increase in transmission limit distance due to PMD by four or more times. For example, if the average PMD coefficient of the transmission line is 0.5 ps/km$^{1/2}$, then by performing the aforementioned PMD compensation, the transmission limit distance is increased from 54 km to 240 km. This is assuming that the value for the PMD under the worst condition is three times the average value (allowable value). This assumption is in general based on the PMD in the laid transmission line following a Maxwell distribution.

However, in such a PMD compensation technique, there is a problem in that as mentioned above, the upper limit of the range of possible compensation of the PMD is limited to one time slot (25 ps at 40 Gb/s) of the signal light. For example, for the average PMD coefficient of old existing transmission lines, it is generally considered to take 2 ps/km$^{1/2}$ as an example. In the case where approximately 600 km is assumed for the maximum transmission line distance, being the same as for the current 10 Gb/s optical transmission system, the value of the PMD under the worst condition is calculated assuming this to be three times the average value (allowable value), and the worst value for the PMD occurring in the transmission line can be as large as:

$$2\ ps/km^{1/2} \times (600\ km)^{1/2} \times 3 \approx 150\ ps.$$

Figure 13:
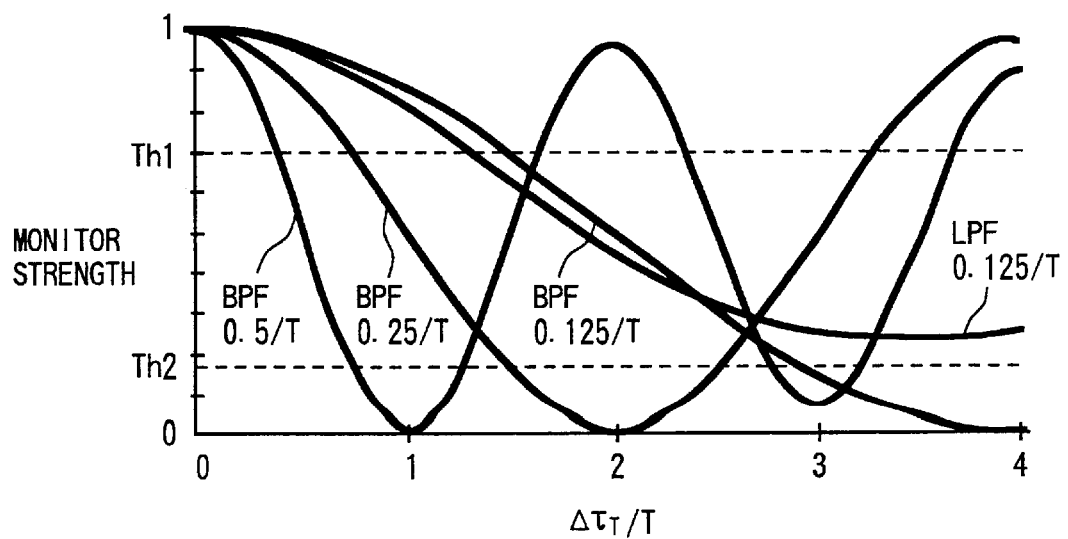
FIG. 13 is a diagram for explaining a conventional PMD compensation technique using a plurality of PMD monitors.

This value is much larger than the upper limit value of the range where compensation is possible in the aforementioned compensation technique, for example, the value of 25 ps for 40 Gb/s signal light. Consequently, extension of the range where PMD compensation is possible becomes necessary. Accordingly, the present invention combines a plurality of PMD monitors to achieve an extension of the range where compensation is possible, and switching controls the respective PMD monitors according to a method different from the known technique explained above for FIG. 13, to realize highly accurate PMD compensation.

Hereunder is a detailed description of the PMD compensation technique according to the present invention.

Figure 1:
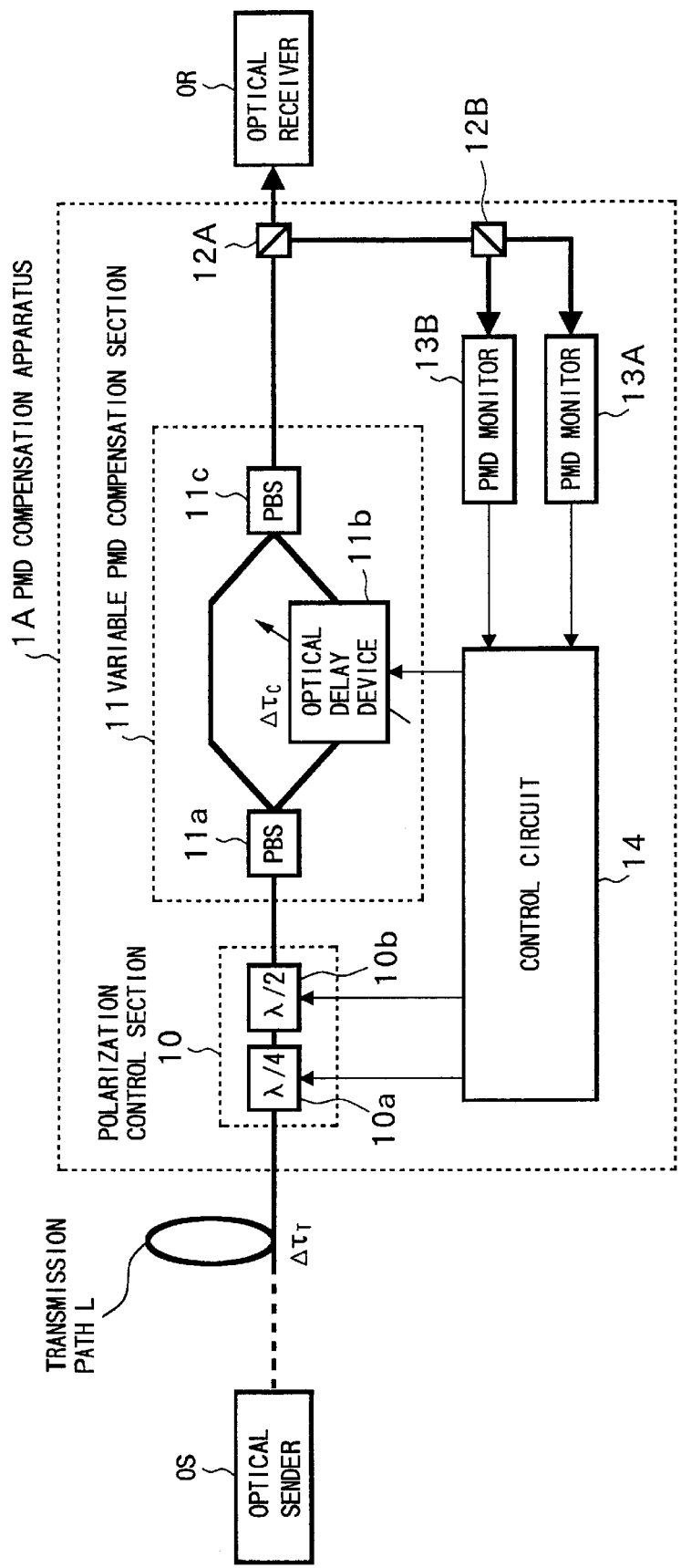
FIG. 1 is a block diagram showing the configuration of a first embodiment of the present invention.

FIG. 1 is a block diagram showing a construction of a first embodiment of a PMD compensation apparatus according to the present invention. In FIG. 1, there is also shown essential parts of an optical transmission system which is constructed using the PMD compensation apparatus of the first embodiment. This is similar to the configuration drawings in other embodiments hereunder.

In FIG. 1, a PMD compensation apparatus 1A is for compensating for influences on signal light due to PMD of a transmission line L, and is here provided along the transmission line L prior to an optical receiver OR. The transmission line L is a standard optical fiber connected between an optical sender OS and the optical receiver OR. Along the transmission line L, various optical devices such as an optical repeater and a wavelength dispersion compensator may be connected. The optical sender OS is a known optical sender which generates signal light (for example NRZ signal light of 40 Gb/s) of transmission speed B (b/s) to output to the transmission line L. The optical receiver OR is a known optical receiver which can receive and process signal light after PMD compensation, output from the PMD compensation apparatus 1A.

The PMD compensation apparatus 1A has a polarization control section 10, a variable PMD compensation section 11, optical couplers 12A and 12B, PMD monitors 13A and 13B, and a control circuit 14. The polarization control section 10 is for adjusting (axially aligning) the polarization direction in signal light of optional polarization state sent from the transmission line L, at the time of input to the latter stage variable PMD compensation section 11, and has, for example, a ¼ wave plate ($\lambda/4$ plate) 10a and a ½ wave plate ($\lambda/2$ plate) 10b. The ¼ wave plate 10a and the ½ wave plate 10b are respectively provided with actuators (not shown in the figure), and are able to be driven from the outside, in accordance with a control signal sent from the control circuit 14.

The variable PMD compensation section 11 has, for example, polarization beam splitters (PBS) 11a and 11c and an optical delay device 11b. The PBS 11a is provided on a branching section of a branch type optical waveguide on the input side, and separates the signal light from the polarization control section 10 into two orthogonally polarization components. One of the polarization components separated by the PBS 11a is sent to the PBS 11c via the optical delay device 11b, while the other polarization component is sent directly to the PBS 11c. The optical delay device 11b is for delaying the light passing therethrough, being a known optical device in which the delay amount can be varied by a control signal from outside. More specifically, for example, a variable optical delay line or the like may be used. By this optical delay device 11b, an optical delay difference $\Delta\tau_T$ is applied between the two polarization components. The PBS 11c is provided a branch section of the branch type optical waveguide at the output side, and combines the respective polarization components output from the PBS 11a and the optical delay device 11b, while maintaining the orthogonal state, to send the combined components to an optical coupler 12A.

The optical coupler 12A branches the signal light output from the variable PMD compensation section 11 into two, and sends one of the branched lights to the optical receiver OR, and sends the other of the branched lights to the optical coupler 12B. The optical coupler 12B further branches the branched light from the optical coupler 12A into two, and respectively sends the respective branched lights to the PMD monitors 13A and 13B.

Figure 2:
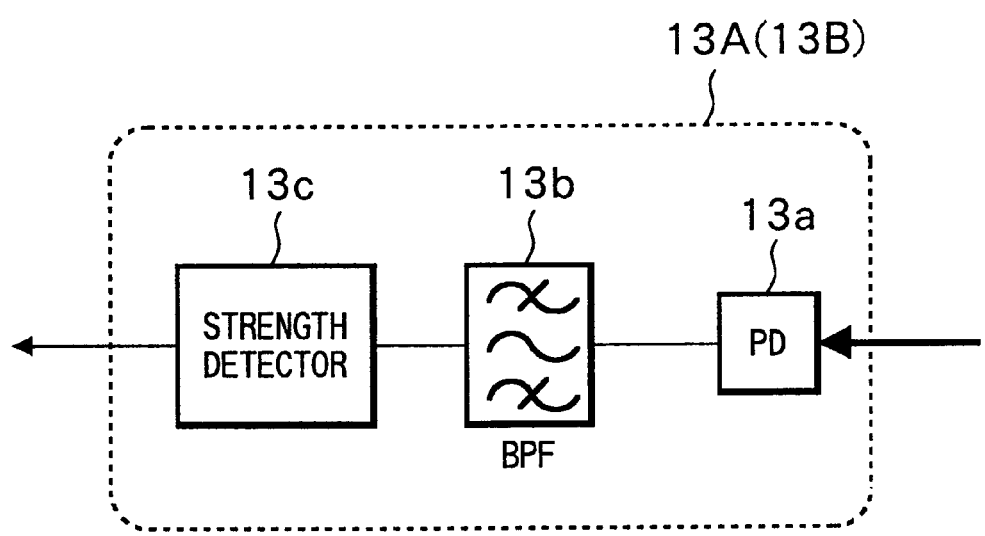
FIG. 2 is a block diagram showing the configuration of a PMD monitor used in the present invention.

The respective PMD monitors 13A and 13B, for example as shown by the block diagram of FIG. 2, each have a photodetector (PD) 13a, a band pass filter (BPF) 13b and a strength detector 13c. The PD 13a converts the branched light from the optical coupler 12B into an electrical signal to output this. The BPF 13b is a band pass filter with a narrow band for extracting a specific frequency component contained in the electrical signal converted by the PD 13a. Here, the central frequency of the pass band of the BPF 13b used in the PMD monitor 13A is made $f_1$, while the central frequency of the pass band of the BPF 13b used in the PMD monitor 13B is made $f_2$ ($<f_1$). The setting of the respective frequencies $f_1$ and $f_2$ is described later. The strength detector 13c detects the strength of the frequency component extracted by the BPF 13b, and outputs a strength detection signal indicating the detection result, to the control circuit 14.

The control circuit 14 judges a PMD amount of the signal light output from the variable PMD compensation section 11 based on the respective strength detection signals output from the respective PMD monitors 13A and 13B, and feedback controls the polarization control section 10 and the variable PMD compensation section 11 so that a PMD compensation amount becomes an optimum. The specific processing operation performed by the control circuit 14 is described later.

Next is a description of the operation of the first embodiment.

At first, a detailed description of the basic principle of the PMD compensation technique according to the present invention will be given corresponding to the construction of the first embodiment.

Figure 3:
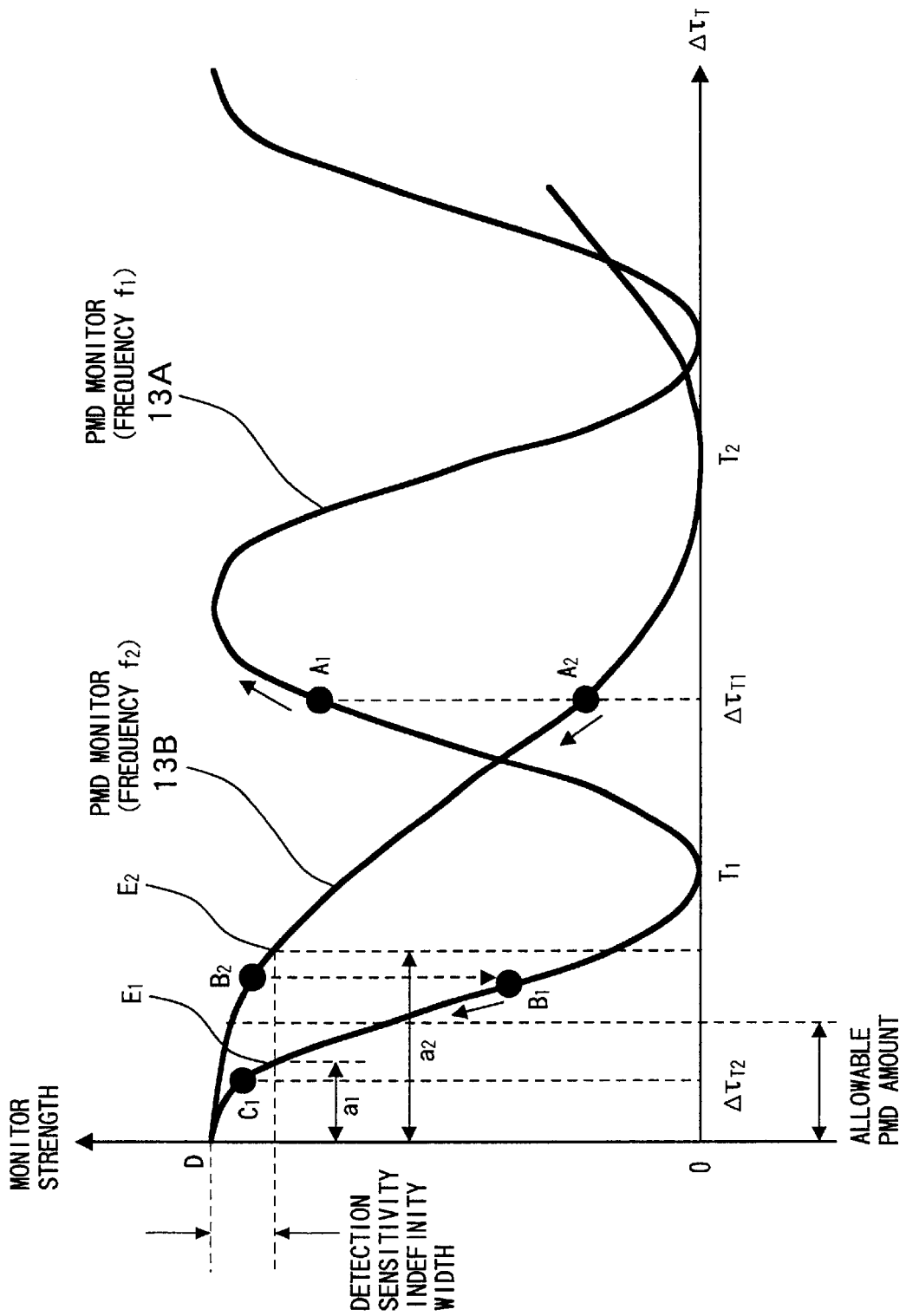
FIG. 3 is a diagram for explaining the basic principle of PMD compensation according to the present invention, being a diagram corresponding to the case where two PMD monitors are used.

FIG. 3 illustrates the basic principle for the case where the two PMD monitors 13A and 13B are used. The horizontal axis represents the PMD amount $\Delta\tau_T$ of the signal light, while the vertical axis represents the strength (monitor strength) of the frequency $f_1$ and $f_2$ components detected by the respective PMD monitors 13A and 13B.

As shown in FIG. 3, the monitor strength detected by the respective PMD monitors 13A and 13B change periodically corresponding to the frequency $f_1$ and $f_2$ components ($f_1 > f_2$) extracted by the BPF 13b, with respect to the change in the PMD amount $\Delta\tau_T$. More specifically, the period of the monitor strength detected by the PMD monitor 13A with the high frequency is smaller than the period of the monitor strength detected by the PMD monitor 13B with the low frequency. Here, the PMD amount for where the monitor strength of the PMD monitor 13A initially becomes zero (or relative minimum) with the increase in the PMD amount $\Delta\tau_T$ is made $T_1$, while the PMD amount for where the monitor strength of the PMD monitor 13B initially becomes zero (or relative minimum) is made $T_2$.

Here, at first the case is considered for where feedback control for maximizing the monitor strength is performed when the amount of PMD occurs in the signal light after transmission in the initial condition (no PMD compensation) is $\Delta\tau_{T1}$ ($>T_1$). In this case, when feedback control is performed using the monitor strength of the PMD monitor 13A, since automatic control is performed in a direction where the post compensation PMD amount $\Delta\tau_T$ becomes large as shown at the $A_1$ point of FIG. 3, waveform deterioration becomes large, and the normal compensation operation is no longer performed. On the other hand, when feedback control is performed using the monitor strength of the PMD monitor 13B, since automatic control is performed in a direction where the post compensation PMD amount $\Delta\tau_T$ becomes small as shown by the $A_2$ point, waveform deterioration is reduced. Consequently, in the aforementioned situation, feedback control of the PMD compensation amount is performed using the PMD monitor 13B on the side where the extraction frequency is low.

Here, as shown in the vicinity of the vertical axis of FIG. 3, it is known that the respective PMD monitors have an indefinite width for the detection sensitivity. This detection sensitivity indefinite width is peculiar to PMD monitors, and contains an indefinite width portion within a short period of time due for example to causes outside of the PMD, or to the branching ratio γ of the optical strength between polarization-modes. If the detection sensitivity indefinite width of such a PMD monitor is considered, the operating point for feedback control using the monitor strength of the PMD monitor 13B converges to between a D point and an $E_2$ point (for example $B_2$ point) in the figure. With the present invention, switching of the PMD monitor is performed paying attention to the timing at which this feedback control converges. That is to say, after the monitor strength of the PMD monitor 13B has stabilized between D and $E_2$, control is switched to feedback control using the monitor strength of the PMD monitor 13A. More specifically, it is possible to perform switching of the PMD monitor, based, for example, on the fact that a required convergence time necessary for the feedback control to converge has elapsed, or the fact that the change amount of the monitor strength within a predetermined time has fallen a predetermined value or less. As a result of performing switching from the PMD monitor 13B to the PMD monitor 13A, the operating point of the feedback control moves from $B_2$ point to $B_1$ point. After this, since automatic control is performed in a direction where the PMD amount $\Delta\tau_T$ becomes small, then finally the operating point converges on between the D point and the $E_1$ point (for example a $C_1$ point) corresponding to the detection sensitivity indefinite width of the PMD monitor, and the PMD amount is compensated up to $\Delta\tau_{T2}$.

Here, in the case where the allowable PMD amount (PMD proof stress) is for example the range shown close to the vertical axis in FIG. 3, then if feedback control is performed using only the monitor strength of the PMD monitor 13B, then as shown by the PMD amount indefinite width $a_2$, there is the possibility that the post compensation PMD amount will exceed the allowable PMD fluctuation amount. However, by using the PMD monitor 13A together with the PMD monitor 13B, the post compensation PMD amount can be suppressed to the allowable PMD amount or less, as shown in the PMD indefinite width $a_1$.

In this manner, with the PMD compensation technique according to the present invention, the switching of the plurality of PMD monitors, instead of being performed as heretofore based on the threshold value (previously set as the absolute value), is performed based on the convergence condition of the feedback control corresponding to the detection sensitivity indefinite width of the PMD monitor. That is to say, the switching of the plurality of PMD monitors is performed based on the fact that the monitor strength has stabilized within the maximum value convergence range. Hence automatic PMD compensation of a high accuracy is realized.

For the setting range of the frequency $f_1$ component extracted by the PMD monitor 13A, the case where the PMD amount indefinite width $a_1$ determined in accordance with the detection sensitivity indefinite width of the PMD monitor coincides with the allowable PMD amount, becomes the lower limit. Furthermore, for the setting range of the frequency $f_2$ component extracted by the PMD monitor 13B, the point where the PMD amount indefinite width $a_2$ of the PMD monitor 13B coincides with the PMD amount $T_1$ for where the monitor strength of the PMD monitor 13A becomes zero (or relative minimum), becomes the lower limit. Consequently, in the case where both the frequencies $f_1$ and $f_2$ are set at the lower limit, the PMD amount $T_2$ where the monitor strength of the PMD monitor 13B becomes zero (or relative minimum) becomes the upper limit of the range where compensation is possible for the PMD.

Next is a description of a specific operation of the PMD compensation apparatus 1A.

With the PMD compensation apparatus 1A, with respect to the signal light of transmission speed B (b/s) in which an optical delay difference $\Delta\tau_T$ occurs between the polarization-modes due to the PMD of the transmission line L, adjustment (axial alignment) of the polarization direction is performed in accordance with an azimuth angle applied by the ¼ wave plate 10a and the ½ wave plate 10b of the polarization control section 10. The branching ratio γ of the optical strength between the two polarization-modes separated by the PBS 11a of the variable PMD compensation section 11 is determined corresponding to the polarization direction of the signal light adjusted by the polarization control section 10. In the variable PMD compensation section 11, one of the polarization components separated by the PBS 11a is delayed by the optical delay device 11b and sent to the PBS 11c, while the other of the polarization components is sent to the PBS 11c without being delayed, and the respective polarization components are combined by the PBS 11c. As a result, the optical delay difference $\Delta\tau_C$ is applied between the two polarization-modes with orthogonal signal lights. Compensation of the PMD is then performed by feedback controlling the azimuth angle of the polarization control section 10 and the optical delay amount of the optical delay device 11b, so that this optical delay difference $\Delta\tau_C$ approximately coincides with the PMD amount $\Delta\tau_T$ in the transmission line L in the absolute value with opposite signs.

This feedback control is performed using a part of the signal light output from the variable PMD compensation section 11. More specifically, a part of the output light from the variable PMD compensation section 11 is branched by the optical coupler 12A and is then further branched into two by the optical coupler 12B, and sent to the respective PMD monitors 13A and 13B. In the PMD monitor 13A, the branched light from the optical coupler 12B is photoelectrically converted by the PD 13a, and after extracting the frequency $f_1$ component contained in the electrical signal by the BPF 13b, the strength of this frequency $f_1$ component is detected by the strength detector 13c. Furthermore, similarly in the PMD monitor 13B, the strength of the frequency $f_2$ component is detected. The respective monitor strength of the frequency $f_1$ and $f_2$ components detected by the PMD monitors 13A and 13B are sent to the control circuit 14. In the control circuit 14, feedback control is executed based on the monitor strength of the respective frequency $f_1$ and $f_2$ components.

Figure 4:
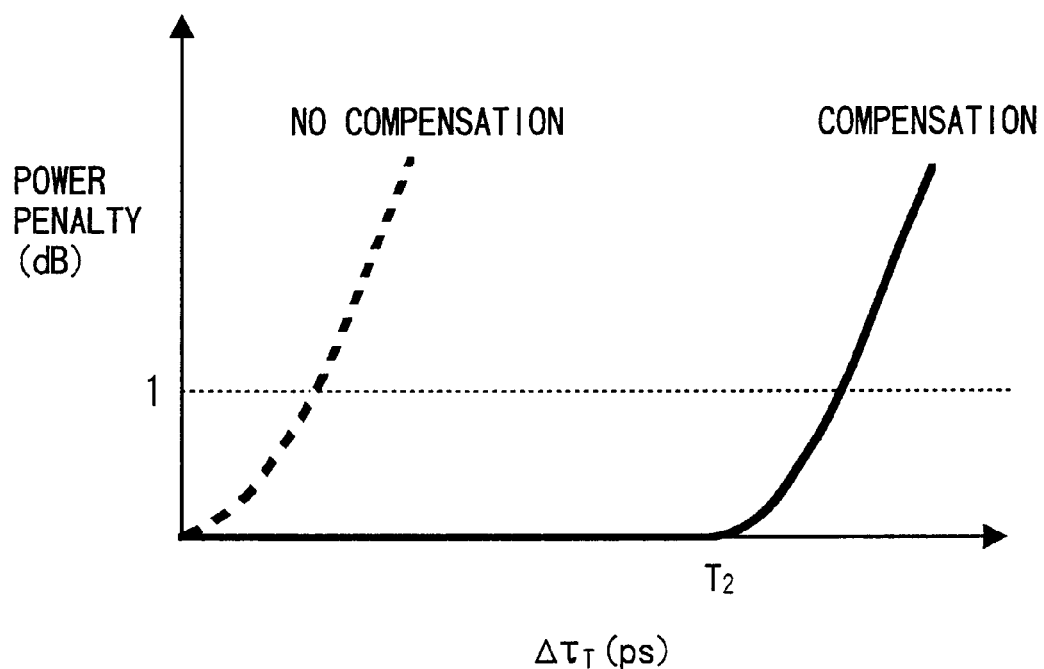
FIG. 4 is a diagram showing changes in power penalty with respect to PMD amount in the first embodiment of the present invention.

FIG. 4 shows changes in power penalty with respect to PMD amount $\Delta\tau_T$ in the case where PMD compensation is performed using the PMD compensation apparatus 1A. As shown in FIG. 4, it is seen that by feedback controlling the azimuth angle of the polarization control section 10 and the optical delay amount of the optical delay device 11b, corresponding to the PMD amount $\Delta\tau_T$ of the signal light, to optimize the PMD compensation amount, the power penalty becomes approximately zero over the range where PMD compensation is possible.

Next, a specific processing operation of the control circuit 14 will be described. Here, the processing operation of the control circuit 14 is considered by dividing into an initial setting mode such as in the system operation start time, and a tracking mode during system operation.

In the initial setting mode, it is necessary to bring the settings of the polarization control section 10 and of the variable PMD compensation section 11 to be optimum values, so that feedback control after operation start is performed correctly.

As an algorithm in the initial setting mode, a control method is possible which uses, for example, only the monitor strength of the PMD monitor 13B on the low side of the extraction frequency.

More specifically, at first, a test signal light for initial setting is sent from the optical sender OS, and the monitor strength of the PMD monitor 13B is measured while respectively scanning the ¼ wave plate 10a and the ½ wave plate 10b of the polarization control section 10. Then, based on the measurement result for the monitor strength, a condition where the monitor strength of the PMD monitor 13B becomes a maximum is judged, and the positions of the ¼ wave plate 10a and the ½ wave plate 10b are set in order to realize this condition. Next, the monitor strength of the PMD monitor 13B is measured while scanning the optical delay amount $\Delta\tau_C$ of the optical delay device 11b of the variable PMD compensation section 11. After this, based on the measurement result for the monitor strength, a condition where the monitor strength of the PMD monitor 13B becomes a maximum is judged, and the delay amount $\Delta\tau_C$ is set in order to realize this condition. By means of such an algorithm, the polarization control section 10 and the variable PMD compensation section 11 are set to a suitable condition for feedback control.

Furthermore, as another algorithm in the initial setting mode, for example, control using the monitor strength of both of the PMD monitors 13A and 13B is also possible.

More specifically, at first, a test signal light for initial setting is sent from the optical sender OS, and the respective monitor strength of the PMD monitor 13B and the PMD monitor 13B are measured while respectively scanning the ¼ wave plate 10a and the ½ wave plate 10b of the polarization control section 10. Then, based on the measurement results for the monitor strength, a condition where the monitor strength of the PMD monitor 13B becomes a maximum is judged, for within a previously set ±α° scanning range, on the basis of the positions of the ¼ wave plate 10a and the ½ wave plate 10b which give a maximum monitor strength for the PMD monitor 13A. Then the positions of the ¼ wave plate 10a and the ½ wave plate 10b are set in order to realize this condition. Next, the monitor strength of the PMD monitor 13A and the PMD monitor 13B are measured while scanning the optical delay amount $\Delta\tau_C$ of the optical delay device 11b. After this, based on the measurement results for the monitor strength, a condition where the monitor strength of the PMD monitor 13A becomes a maximum is judged, for within a previously set ±β° scanning range, on the basis of the positions of the ¼ wave plate 10a and the ½ wave plate 10b which give a maximum monitor strength for the PMD monitor 13B. Then the delay amount $\Delta\tau_C$ is set in order to realize this condition. By means of such an algorithm, the polarization control section 10 and the variable PMD compensation section 11 are set to a more suitable condition for feedback control.

After completion of the initial setting as described above, operation of the system is started. Then, in accordance with the basic principle for PMD compensation as described before using FIG. 3, while switching the PMD monitors 13A and 13B, the PMD compensation amount is feedback controlled so that the strength of each monitor becomes a maximum. During this system operation, it is necessary to tracking control the setting of the polarization control section 10 and the variable PMD compensation section 11 so that optimum PMD compensation is always realized following changes in the PMD due to environmental change such as temperature (tracking mode). As one example of this tracking control, in the feedback control of the PMD compensation, a control is possible which slightly changes (dithers) a parameter which extends an influence on the optical delay amount $\Delta\tau_C$ in the neighborhood of the setting where the monitor strength becomes a maximum, to automatically detect a new maximum point.

As a specific algorithm in the tracking mode, for example, control is possible which normally performs dithering with respect to the ¼ wave plate 10a and the ½ wave plate 10b, and inserts dithering with respect to the optical delay amount $\Delta\tau_C$ of the optical delay device 11b for each fixed time, and optimizes respective setting parameters so that the monitor strength of the respective PMD monitors 13A and 13B become a maximum.

Furthermore, as another algorithm in the tracking mode, control is also possible for sequentially performing dithering with respect to the ¼ wave plate 10a, the ½ wave plate 10b and the optical delay amount $\Delta\tau_C$. For example, control may be such that dithering is switched in sequence from the ¼ wave plate 10a→ the ½ wave plate 10b→ optical delay amount $\Delta\tau_C$→ the ¼ wave plate 10a→..., and each of the setting parameters is optimized so that the monitor strength of the respective PMD monitors 13A and 13B become a maximum.

In the respective algorithms of the tracking mode as described above, the control circuit 14 respectively receives strength detection signals from the respective PMD monitors 13A and 13B, and determines one of the PMD monitors to be used for feedback control corresponding to the respective monitor strength. At this time, normally the setting parameters are optimized in the initial setting mode. Therefore, even if dithering is executed, it is considered that changes in the PMD amount $\Delta\tau_T$ converge in the range where the monitor strength of the PMD monitor 13A on the high frequency side becomes a minimum (the range where $\Delta\tau_T$ in FIG. 3 does not exceed $T_1$). Therefore in this case, the monitor strength of the PMD monitor 13A on the high frequency side may be selected. However, there is also the possibility that due to environmental change such as sudden temperature change, the transmission line PMD amount $\Delta\tau_T$ changes significantly and exceeds $T_1$. In such a case, with the monitor strength of the respective PMD monitors 13A and 13B, as shown for example by $A_1$ point and $A_2$ point in FIG. 3, it can be seen that by performing feedback control so that monitor strength become a maximum, the change directions (the movement direction of each point) of the respective monitor strength with respect to the change direction of the PMD amount become opposite to each other. Therefore, it is effective to add an algorithm to the control circuit 14, which at such a time, preferentially selects the monitor strength of the PMD monitor 13B on the low frequency side and performs feedback control.

With the PMD compensation apparatus 1A of the first embodiment as described above, feedback control is performed accurately following changes in the PMD in the transmission line L, by performing switching of the PMD monitors 13A and 13B based on a condition where the monitor strength converges on a maximum value, rather than on the basis of a previously set threshold value for the absolute value. Therefore PMD compensation at high accuracy can be realized. Furthermore, the setting of the frequency $f_1$ and $f_2$ components extracted by the respective PMD monitors 13A and 13B can be determined in accordance with the detection sensitivity indefinite width of the PMD monitor, without being restricted to a specific frequency of ½ times or ¼ times the transmission speed as heretofore. Therefore application to a system where for example the transmission speed of the signal light changes is possible. Moreover, since the frequency difference of the respective PMD monitors can be maintained at a maximum limit, a wide range where compensation is possible can be realized even with two PMD monitors. As a result, it is possible to realize an optical transmission system that can transmit ultra high-speed signal light of for example 40 Gb/s over a long distance.

Next is a description of a modified example of the first embodiment.

Figure 5:
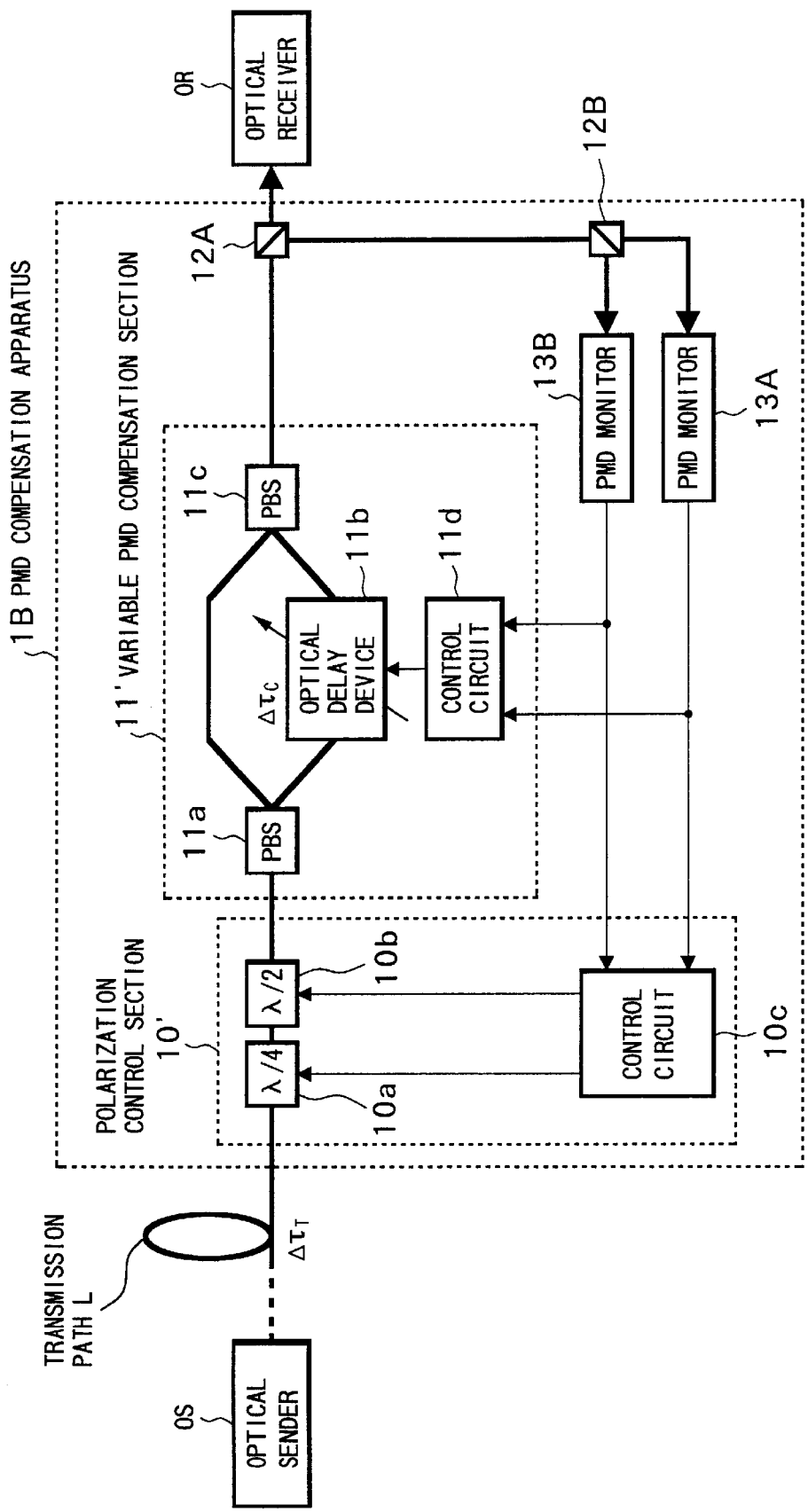
FIG. 5 is a block diagram showing a modified example of the first embodiment of the present invention.

FIG. 5 is a block diagram showing the configuration of a PMD compensation apparatus according to the modified example of the first embodiment.

In FIG. 5, this PMD compensation apparatus 1B is one where, in the configuration of the PMD compensation apparatus of the first embodiment, a function corresponding to the control circuit 14 is incorporated in the polarization control section 10 and the variable PMD compensation section 11. More specifically, a polarization control section 10' incorporating a control circuit 10c for controlling the ¼ wave plate 10a and the ½ wave plate 10b is provided, and a variable PMD compensation section 11' incorporating a control circuit 11d for controlling the optical delay device 11b is provided, and the respective strength detection signals output from the PMD monitors 13A and 13B are respectively sent to the control circuit 10c of the polarization control section 10', and the control circuit 11d of the variable PMD compensation section 11'. The configuration of components other than those mentioned above, and the configuration of the optical transmission system to which the PMD compensation apparatus 1B is applied, is the same as for the case of the first embodiment, and hence description is omitted.

With the PMD compensation apparatus 1B of the above-mentioned configuration, feedback control which uses the respective monitor strength of the PMD monitors 13A and 13B is respectively performed by the respective control circuits 10c and 11d of the polarization control section 10' and the variable PMD compensation section 11'. The control operation of the respective control circuits 10c and 11d is basically the same as the control operation of the control circuit 14 of the aforementioned first embodiment. The only point of difference is that in the control circuit 10c of the polarization control section 10', the setting parameter, being the object of the feedback control, becomes the respective positions of the ¼ wave plate 10a and the ½ wave plate 10b, while in the control circuit 11d of the variable PMD compensation section 11', the setting parameter, being the object of the feedback control, becomes the position of the optical delay amount $\Delta\tau_C$ of the optical delay device.

In this manner, by respectively providing control circuits in the polarization control section 10' and the variable PMD compensation section 11', then compared to the case of the first embodiment, for example, replacement or upgrading and the like of the polarization control section 10' and the variable PMD compensation section 11' can be easily performed.

Next is a description of another modified example of the first embodiment.

Figure 6:
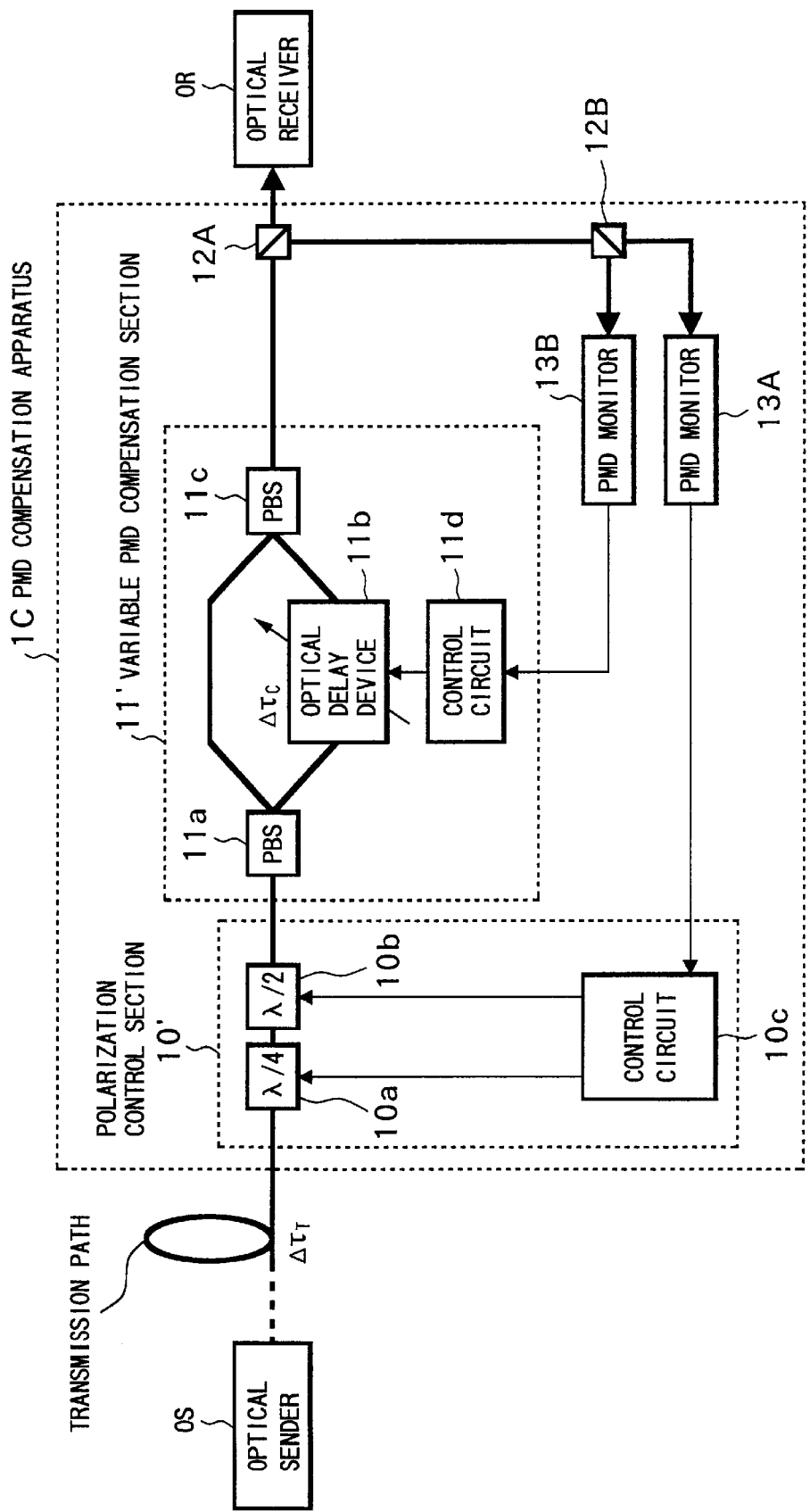
FIG. 6 is a block diagram showing another modified example of the first embodiment of the present invention.

FIG. 6 is a block diagram showing the configuration of a PMD compensation apparatus according to the other modified example of the first embodiment.

In FIG. 6, this PMD compensation apparatus 1C is one where, in the configuration of the modified example shown in FIG. 5, only the detection strength signal from the PMD monitor 13A on the high extraction frequency side is sent to the control circuit 10c of the polarization control section 10', and only the detection strength signal from the PMD monitor 13B on the low extraction frequency side is sent to the control circuit 11d of the variable PMD compensation section 11'. The configuration of components other than those mentioned above, and the configuration of the optical system to which the present PMD compensation apparatus 1C is applied, is the same as for the case of the modified example of FIG. 5, and hence description is omitted.

With the PMD compensation apparatus 1C of this configuration, the respective positions of the ¼ wave plate 10a and the ½ wave plate 10b are feedback controlled using the monitor strength of the frequency $f_1$ component of the PMD monitor 13A, and the optical delay amount $\Delta\tau_C$ of the optical delay device 11b is feedback controlled using the monitor strength of the frequency $f_2$ component of the PMD monitor 13B.

In this manner, by controlling the polarization control section 10' using the monitor strength on the high extraction frequency side, and controlling the variable PMD compensation section 11' using the monitor strength on the low extraction frequency side, PMD compensation with higher speed response is possible. That is, it is considered that the response speed required for the polarization control section 10' becomes faster than the response speed required for the variable PMD compensation section 11', since it is necessary for rapidly performing axial alignment of the input light to the variable PMD compensation section 11'. Therefore, if the polarization control section 10' is controlled using only the monitor strength on the high frequency side for which the feedback control convergence is faster, the setting parameters can be optimized without reducing the response speed of the polarization control section 10'.

Next is a description of a second embodiment of a PMD compensation apparatus according to the present invention.

Figure 7:
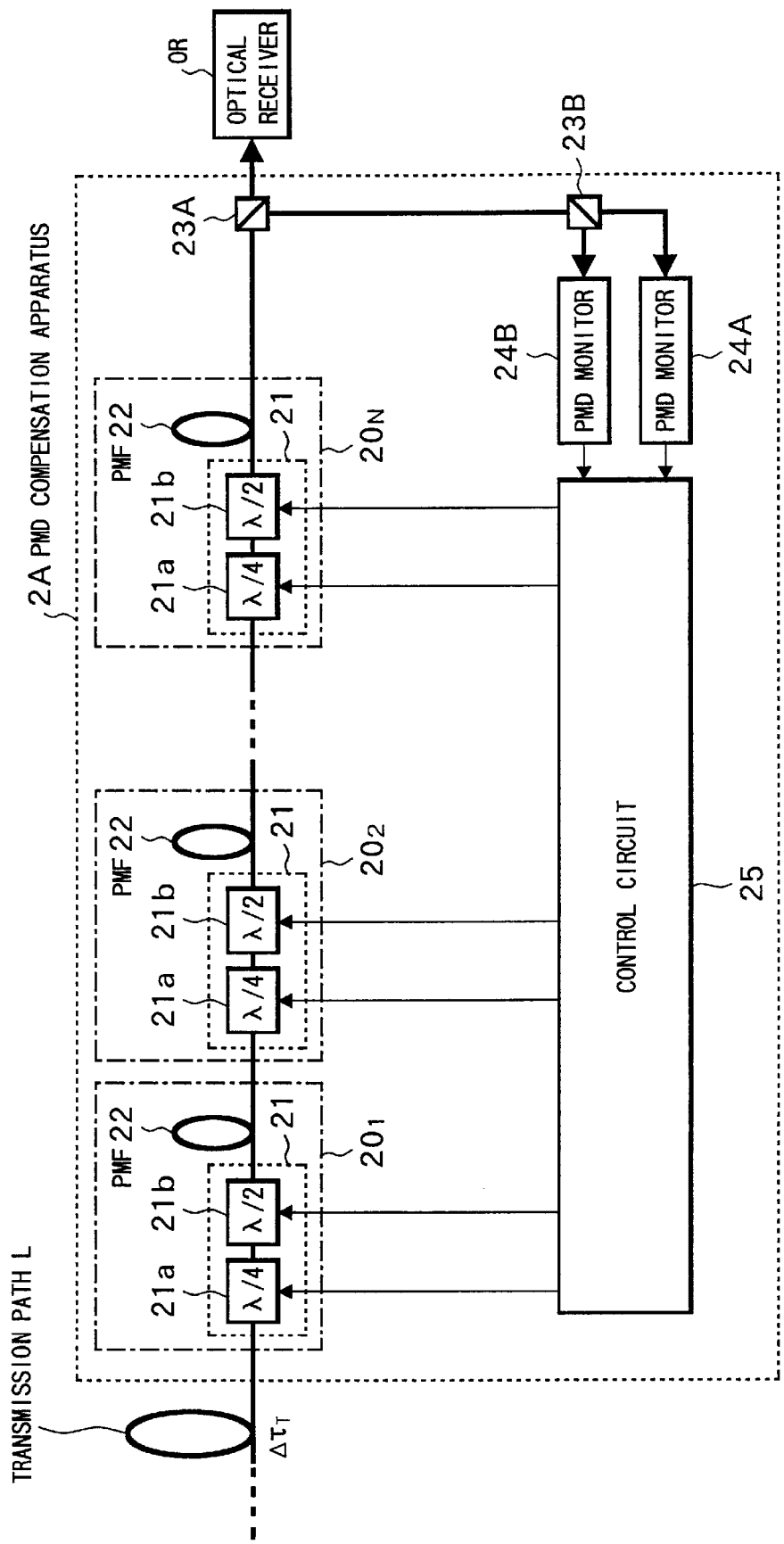
FIG. 7 is a block diagram showing the configuration of a second embodiment of the present invention.

FIG. 7 is a block diagram showing the second embodiment of the PMD compensation apparatus according to the present invention.

In FIG. 7, this PMD compensation apparatus 2A comprises multistaged connected PMD compensation devices $20_1$~$20_N$ to which signal light (for example NRZ signal light of 40 Gb/s) of transmission speed B (b/s) sent from an optical sender (not shown in the figure) via a transmission line L is sequentially input, an optical coupler 23A for branching a part of the signal light passed through the N staged PMD compensation units $20_1$~$20_N$ and sent to an optical receiver OR, an optical coupler 23B for further branching into two the branched light of the optical coupler 23A, a PMD monitor 24A for extracting a frequency $f_1$ component from one of the branched lights of the optical coupler 23B and detecting the strength thereof, a PMD monitor 24B for extracting a frequency $f_2$ component from the other branched light of the optical coupler 23B and detecting the strength thereof, and a control circuit 25 for feedback controlling the respective PMD compensation units $20_1$~$20_N$ using the respective monitor strength detected by the PMD monitors 24A and 24B. Here, the optical couplers 23A and 23B are the same as the optical couplers 12A and 12B in the first embodiment. Furthermore, the PMD monitors 24A and 24B are the same as the PMD monitors 13A and 13B in the first embodiment.

The respective PMD compensation units $20_1$~$20_N$ each have a polarization control section 21 and a fixed delay element 22. The polarization control section 21 is for adjusting (axial aligning) the polarization direction of the input light to the latter stage fixed delay element 22, and has, for example, a ¼ wave plate ($\lambda/4$ plate) 21a and a ½ wave plate ($\lambda/2$ plate) 21b. The ¼ wave plate 21a and the ½ wave plate 21b are respectively provided with actuators (not shown in the figure), and are able to be driven from the outside, in accordance with a control signal sent from the control circuit 25. The fixed delay element 22 uses, for example, a polarization maintaining fiber (PMF) or the like to apply a fixed optical delay amount between the polarization-modes of the signal light output from the polarization control section 21. Here, the respective optical delay amounts applied in the respective PMD compensation units $20_1$~$20_N$ are $\Delta\tau_{C1}$~$\Delta\tau_{CN}$.

The control circuit 25 judges the PMD amount of the signal light output from the PMD compensation unit $20_N$ based on the monitor strength output from the respective PMD monitors 24A and 24B, and feedback controls the respective PMD compensation units $20_1$~$20_N$ so that the PMD compensation amount becomes an optimum.

Next is a description of the operation of the second embodiment.

Figure 8:
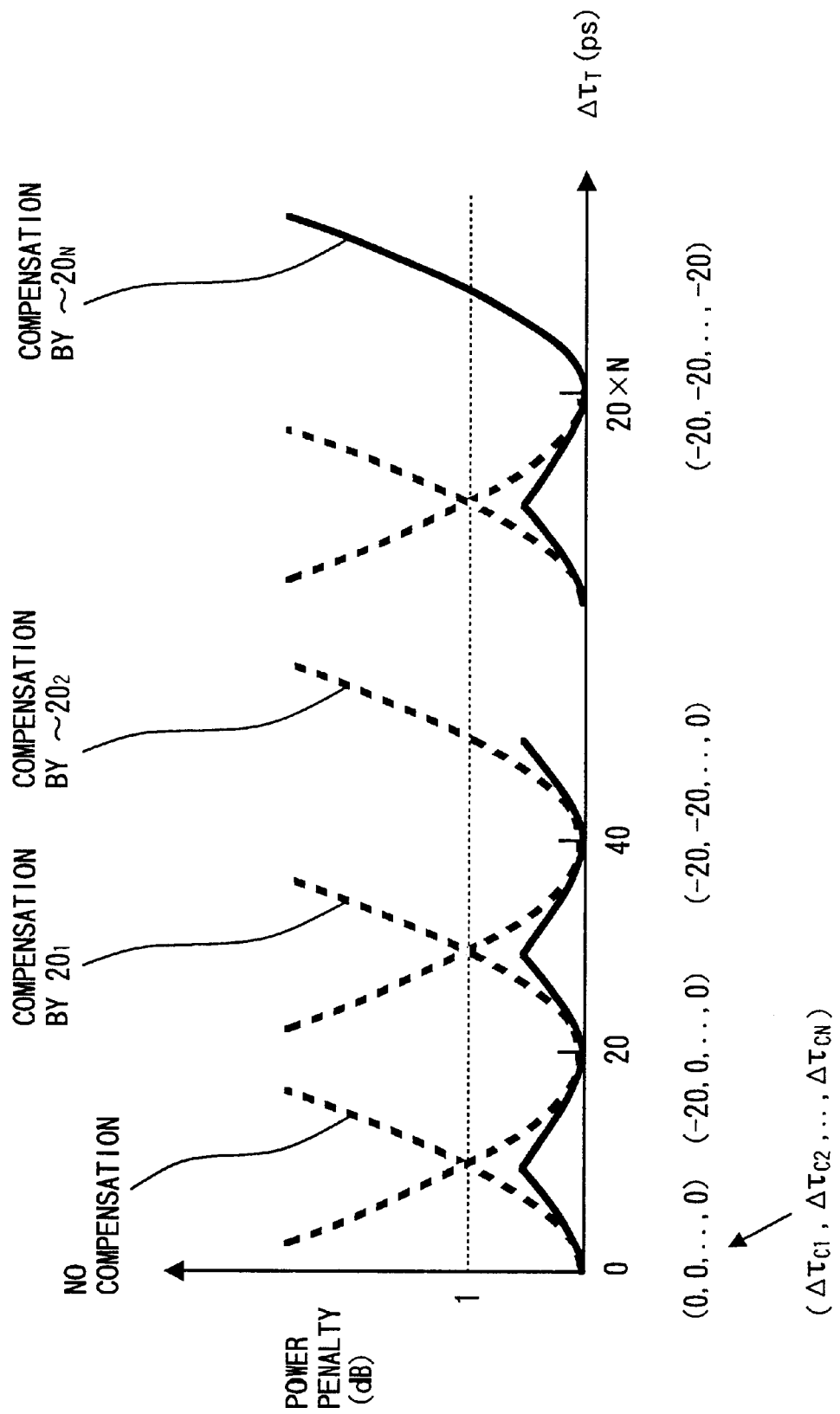
FIG. 8 is a diagram for explaining the operation of the second embodiment.

FIG. 8 shows changes in the power penalty with respect to the PMD amount $\Delta\tau_T$, in the case where PMD compensation is performed using the PMD compensation apparatus 2A of the aforementioned configuration.

As shown in FIG. 8, if the allowable penalty due to PMD with respect to NRZ signal light of a transmission speed B of 40 Gb/s is made 1 dB, the PMD proof stress for the case of no PMD compensation becomes approximately 10 ps. Therefore, in this PMD compensation apparatus 2A, the optical delay amounts $\Delta\tau_{C1}$~$\Delta\tau_{CN}$ in the fixed delay elements 22 of the respective PMD compensation units $20_1$~$20_N$ are respectively set, for example, to 20 ps. Then, by the control circuit 25, the polarization control section 21 positioned prior to each fixed delay elements 22 is feedback controlled in accordance with the basic principle described before for FIG. 3, so that the monitor strength of the PMD monitors 24A and 24B become a maximum.

More specifically, when the PMD amount $\Delta\tau_T$ of the signal light becomes for example 20 ps, 40 ps, ..., 20×Nps, the polarization control sections 21 of the respective PMD compensation units $20_1$~$20_N$ are controlled so as to realize a combination of the optical delay amounts ($\Delta\tau_{C1}$, $\Delta\tau_{C2}$, ... $\Delta\tau_{CN}$) in the PMD compensation units $20_1$~$20_N$ as shown corresponding to below the horizontal axis of FIG. 8. As a result, it is possible to make the post compensation PMD amount become zero, so that the power penalty after PMD compensation becomes zero. In FIG. 8, the value of PMD amount $\Delta\tau_T$ occurring in the transmission line L is denoted positive, and the values of the optical delay amounts $\Delta\tau_{C1}$~$\Delta\tau_{CN}$ which compensate for the value of PMD amount are denoted as negative. However, these may be set with opposite signs to this.

For example, considering a case where a PMD amount $\Delta\tau_T$=20 ps of the signal light is compensated, by controlling the polarization direction of the signal light input to the fixed delay element 22 of the first stage PMD compensation unit $20_1$ by the polarization control section 21 thereof, so as to coincide with the direction where the maximum optical delay is produced in the fixed delay element 22, and by controlling the polarization directions of the signal light input to the respective fixed delay elements 22 of the other PMD compensation units $20_2$~$20_N$ by the polarization control sections 21 thereof, so as to coincide with the direction where the optical delay amounts in the fixed delay elements 22 become zero, then combination of the optical delay amounts ($\Delta\tau_{C1}$, $\Delta\tau_{C2}$, ..., $\Delta\tau_{CN}$)=(−20, 0, ..., 0) is realized.

In the case of the abovementioned setting example, the optical delay amounts, by N stage connecting the 20 ps fixed delay elements 22, can be increased up to 20 ps×N+10 ps, for the PMD amounts $\Delta\tau_T$ which can be compensated for. For example, in order to compensate for a PMD amount of the transmission line L of $\Delta\tau_T$=150 ps with the PMD compensation apparatus 2A, a seven staged PMD compensation unit may be used. In the case where the abovementioned contents are generalized, when the allowable PMD amount is made $\Delta\tau_{max}$, then by N stage connecting the fixed delay elements 22 of the optical delay amounts $2\Delta\tau_{max}$, the upper limit of the range where PMD compensation is possible becomes (2n+1) $\Delta\tau_{max}$.

Here, the optical delay amount of the fixed delay element 22 is set to two times the allowable PMD amount. However, the present invention is not limited to this. In the case where as shown in FIG. 8, the PMD amount $\Delta\tau_T$ of the transmission line L is exactly compensated for by the combination of the PMD compensation units $20_1$~$20_N$ ($\Delta\tau_T$=20 ps, 40 ps, . . . , 20× Nps), the value of the power penalty becomes approximately zero. However, it can be seen that when the PMD amount $\Delta\tau_T$ of the transmission line L deviates from these values, the value of the power penalty rises. In this case also, it is necessary that the value of the power penalty does not exceed the allowable penalty (for example 1 dB etc.) due to PMD. To this end, it is desirable to set the value of the fixed optical delay amount in the PMD compensation units $20_1$~$20_N$ of the respective stages to be small. However, when a required range where PMD compensation is possible is to be maintained, since this increases the stages of the PMD compensation units, it is necessary to consider a trade off between the transmission characteristics and the size of the overall system, to decide the optical delay amounts of the respective stages and the number of PMD compensation units.

In this manner, according to the PMD compensation apparatus of the second embodiment, the same effect as for the case of the first embodiment can also be obtained by multistage connecting PMD compensation units each comprising the polarization control section 21 and the fixed delay element 22 and by feedback controlling the polarization control sections 21 of the respective PMD compensation units so that the monitor strength of the PMD monitors 24A and 24B become a maximum,. Furthermore, with the fixed delay element 22, since device actualization is comparatively simple compared to the variable PMD compensation section 11 used in the first embodiment, there is also the advantage that this PMD compensation apparatus 2A can be easily constructed.

Next is a description of a modified example of the second embodiment.

Figure 9:
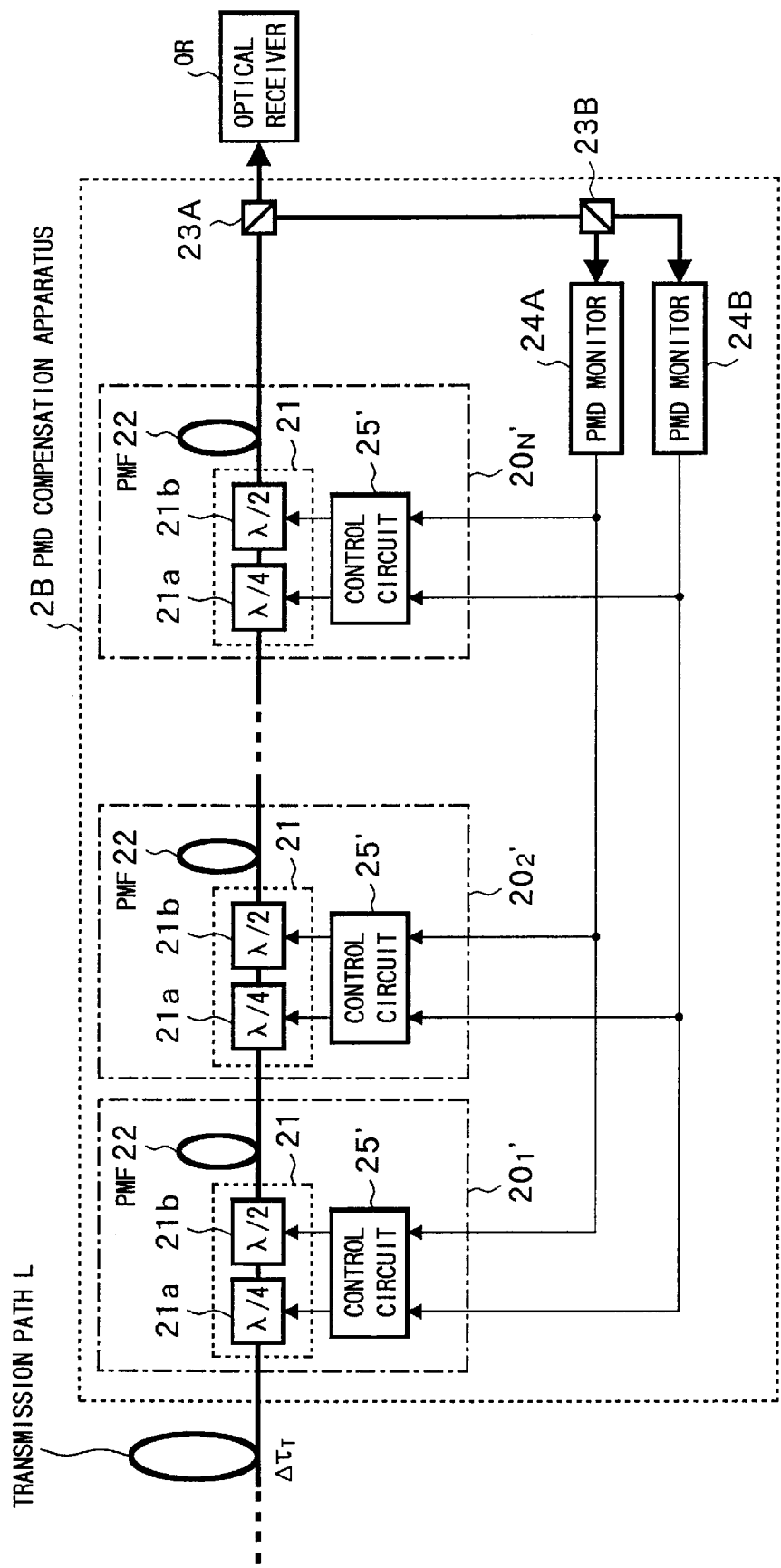
FIG. 9 is a block diagram showing a modified example of the second embodiment of the present invention.

FIG. 9 is a block diagram showing the configuration of a PMD compensation apparatus according to the modified example of the second embodiment.

In FIG. 9, this PMD compensation apparatus 2B is one where, in the configuration of the PMD compensation apparatus 2A of the abovementioned second embodiment, a function corresponding to the control circuit 25 is incorporated into the PMD compensation units $20_1$~$20_N$. More specifically, a polarization control section 25' for controlling the ¼ wave plate 21a and the ½ wave plate 21b is provided in each of the PMD compensation units $20_1$~$20_N$, and the respective strength detection signals output from the PMD monitors 24A and 24B are respectively sent to the control circuits 25' of the respective PMD compensation units $20_1$~$20_N$. The configuration of components other than those mentioned above, and the configuration of the optical transmission system to which the PMD compensation apparatus 2B is applied, is the same as for the case of the second embodiment.

With the PMD compensation apparatus 2B of the abovementioned configuration, feedback control using the respective monitor strength of the PMD monitors 24A and 24B is respectively performed by the respective control circuits 25' of the PMD compensation units $20_1$~$20_N$. The control operation of the respective control circuits 25' is basically the same as the control operation of the control circuit 25 of the aforementioned second embodiment. The only point of difference is that the setting parameter being the object of the feedback control becomes the respective positions of the ¼ wave plate 21a and the ½ wave plate 21b in each unit.

In this manner, by respectively providing control circuits 25' in the respective PMD compensation units $20_1$~$20_N$, then compared to the case of the second embodiment, for example, replacement or upgrading and the like of the individual PMD compensation units $20_1$~$20_N$ can be easily performed.

Next is a description of a third embodiment of a PMD compensation apparatus according to the present invention.

With the above described first embodiment and second embodiment, the case was described for where feedback control of the PMD compensation amount was performed using the monitor strength of two PMD monitors with different extraction frequencies. With the third embodiment, consideration is given to the case where the range where PMD compensation is possible is further extended. In order to further extend the range where compensation is possible in the first and second embodiments, the detection sensitivity of the PMD monitor may be raised and the indefinite width narrowed, or the number of PMD monitors may be increased. Since there is a certain limit in narrowing the detection sensitivity indefinite width of the PMD monitor, here it is considered to increase the number of PMD monitors to three to further extend the range where compensation is possible.

Figure 10:
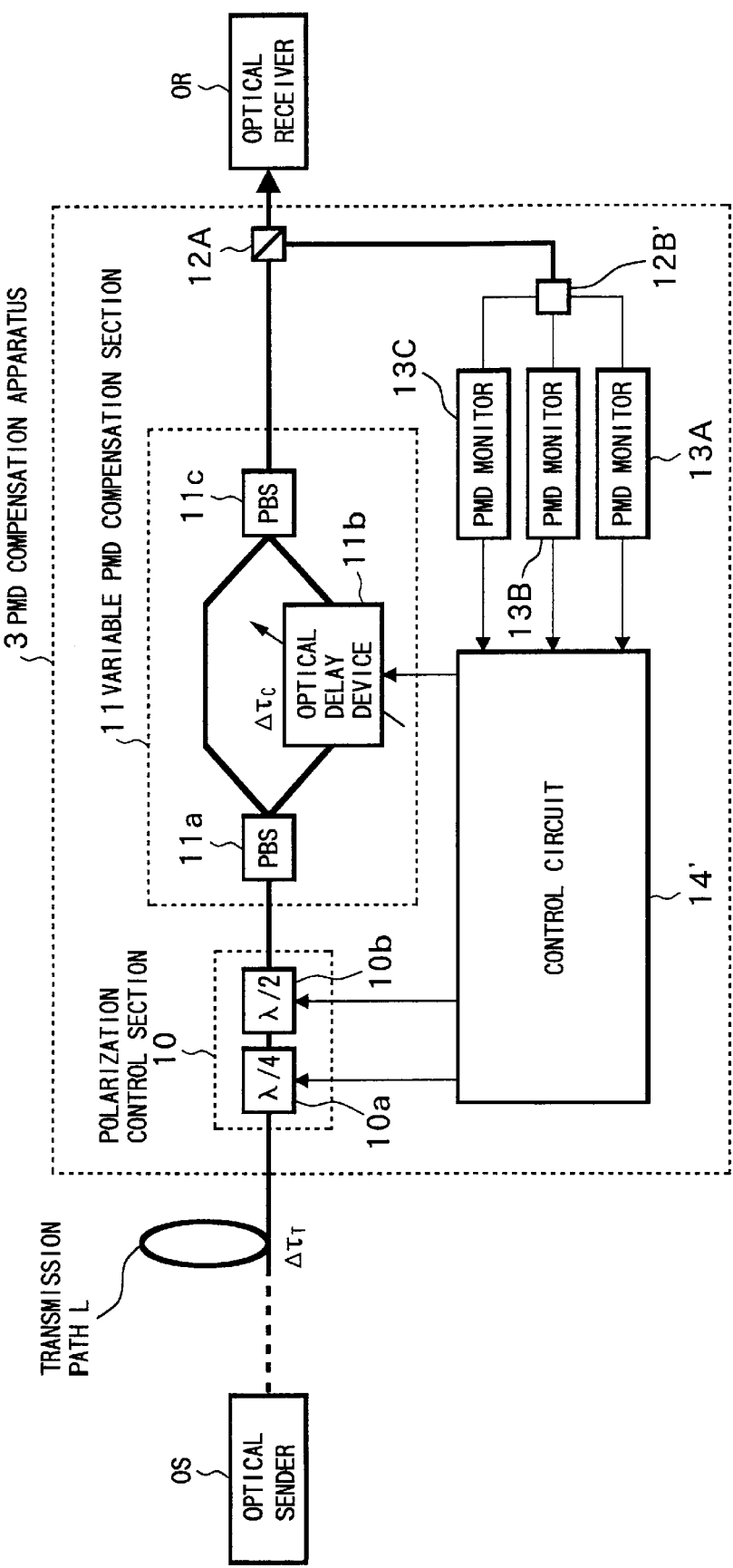
FIG. 10 is a block diagram showing the configuration of a third embodiment of the present invention.

FIG. 10 is a block diagram showing the third embodiment of a PMD compensation apparatus according to the present invention.

In FIG. 10, the point where the configuration of this PMD compensation apparatus 3 differs from the configuration of the PMD compensation apparatus 1A of the first embodiment, is that a PMD monitor 13C for detecting the strength of a frequency $f_3$ component is newly provided, and instead of the optical coupler 12B, there is provided an optical coupler 12B' for branching into three the branched light of the optical coupler 12A, and respectively sending the three branched lights to the respective PMD monitors 13A, 13B and 13C. The configuration of the PMD compensation apparatus 3 other than as mentioned above, and the configuration of the optical transmission system which uses this PMD compensation apparatus 3, is the same as for the case of the first embodiment.

The PMD monitor 13C, as well as the configuration of the aforementioned PMD monitors 13A and 13B shown in FIG. 2, comprises a photodetector (PD) 13a, a band pass filter (BPF) 13b and a strength detector 13c. The BPF 13b of the PMD monitor 13C has a pass band of the central frequency of $f_3$ ($<f_2<f_1$). The monitor strength detected by this PMD monitor 13C is transmitted to a control circuit 14' together with the respective monitor strength of the other PMD monitors 13A and 13B, and used in feedback control of the PMD compensation amount.

Here, a description is given of the feedback control of the PMD compensation amount using the three PMD monitors.

Figure 11:
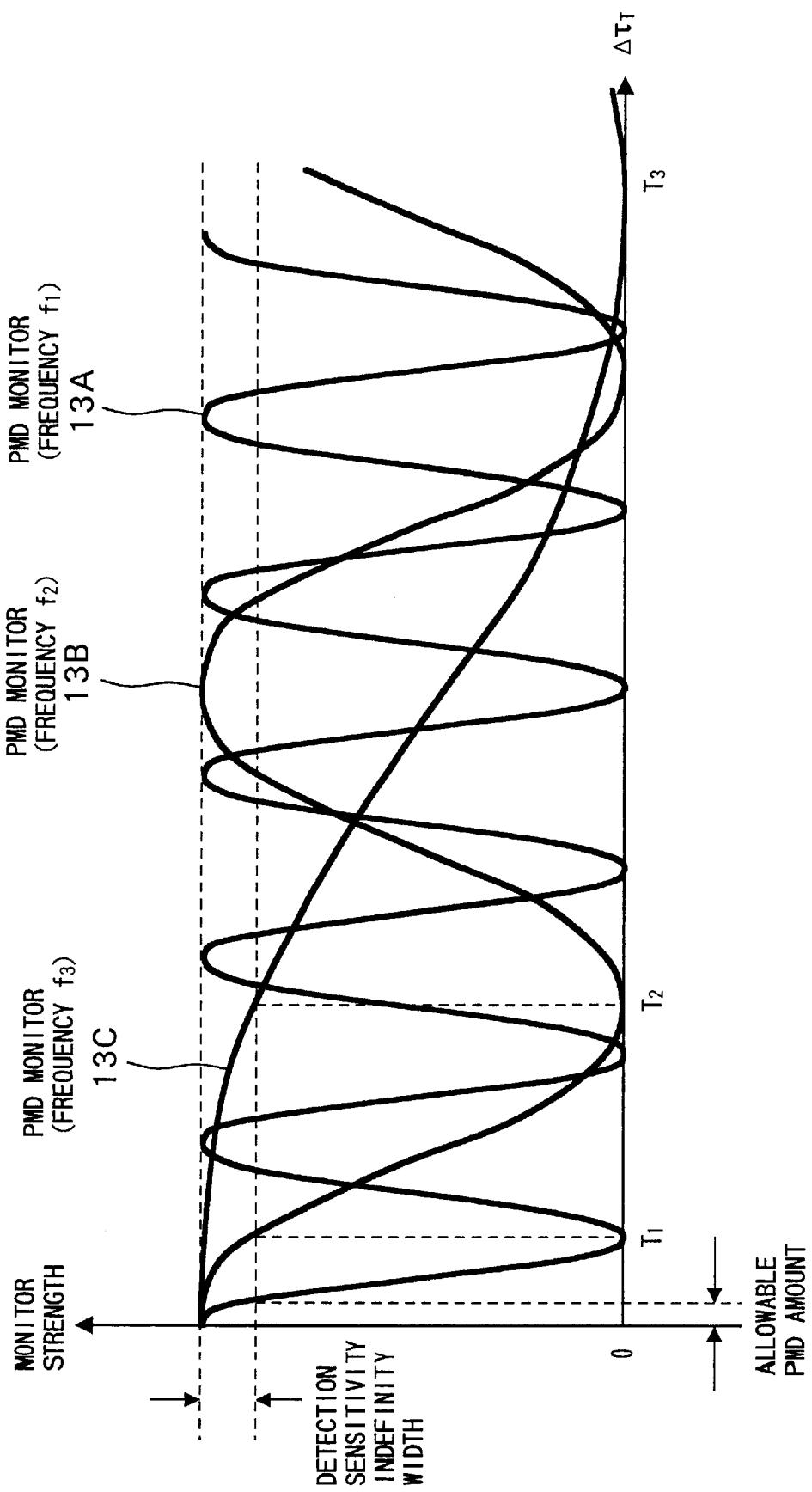
FIG. 11 is a diagram for explaining the basic principle of PMD compensation according to the present invention, being a diagram corresponding to the case where three PMD monitors are used.
Figure 12:
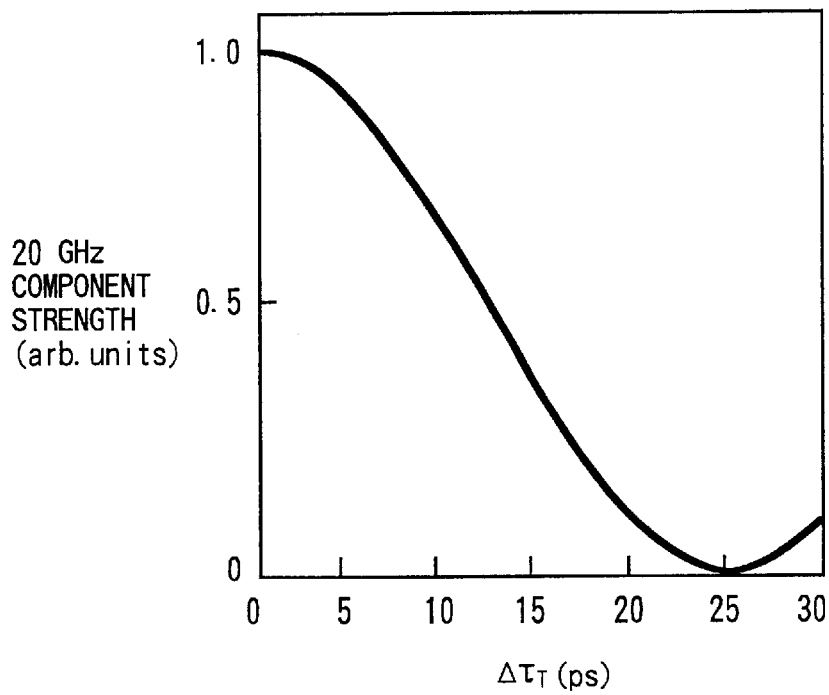
FIG. 12 is a diagram for explaining a situation in the conventional PMD compensation technique, where a range where compensation is possible is restricted to one time slot.

FIG. 11 is a diagram for explaining the effect of extending the PMD compensation range by increasing the PMD monitors to three. The horizontal axis represents the PMD amount $\Delta\tau_T$ occurring in the signal light due to the transmission line L, while the vertical axis represents the strength (monitor strength) of the frequency $f_1 \sim f_3$ components detected by the respective PMD monitors 13A through 13C. Furthermore, the PMD amount for where the monitor strength of the PMD monitor 13C finally becomes zero (or relative minimum) is made $T_3$. In addition, here the respective frequencies $f_1$ through $f_3$ respectively extracted by the PMD monitors 13A through 13C, are set to minimum values determined from the allowable PMD amount and the detection sensitivity indefinite width of the PMD monitor.

With PMD compensation using the three PMD monitors 13A through 13C as shown in FIG. 11, at first, after the feedback control using the monitor strength (frequency $f_3$ component) of the PMD monitor 13C has stabilized within a maximum value convergence range, and the PMD value becomes $T_2$ or less, this feedback control is switched to the feedback control using the monitor strength (frequency $f_2$ component) of the PMD monitor 13B. Then, after the feedback control by the PMD monitor 13B has stabilized within the maximum value convergence range and the PMD amount becomes $T_1$ or less, this feedback control is switched to the feedback control using the monitor strength (frequency $f_1$ component) of the PMD monitor 13A, and the PMD amount $\Delta\tau_T$ is made the allowable PMD amount or less. In this manner, the method for switching the PMD monitor performed on the basis of the condition where the monitor strength becomes a maximum, is the same as the basic principle of the present invention described above for FIG. 3. Here, by increasing the PMD monitor to three systems, the upper limit of the range where PMD compensation is possible can be greatly extended from $T_2$ at the time of two systems to $T_3$.

Here, the aforementioned extension effect of the range where PMD compensation is possible will be quantitatively explained.

Generally, a characteristic curve K ($f_e$) as shown in FIG. 11 which represents the monitor strength with respect to the frequency $f_e$ extracted by the PMD monitor, can be expressed by the following equation (1) in the case where the optical strength branching ratio $\gamma$ is 0.5.

$$K(f_e) = 1 - 4\gamma(1-\gamma)\sin^2(\pi f_e \Delta\tau_T) \qquad (1)$$
$$= \{1 + \cos(2\pi f_e \Delta\tau_T)\}/2$$

If the detection sensitivity indefinite width of the PMD monitor is made $\Delta I$ times the peak (maximum value of the monitor strength), and the allowable PMD amount is made $\Delta\tau_{max}$, then in relation to the characteristic curve ($f_e = f_1$) corresponding to the PMD monitor 13A, the following relationship is established.

$$\{1+\cos(2\pi f_1\Delta\tau_{max})\}/2 = 1-\Delta I$$

$$\therefore f_1 = \cos^{-1}(1-2\Delta I)/2\pi\Delta\tau_{max}$$

$$\therefore T_1 = 1/(2f_1) = \pi\Delta\tau_{max}/\cos^{-1}(1-2\Delta I)$$

Furthermore, similarly for other PMD monitors also, the following relationship is established.

$$T_2 = \pi T_1/\cos^{-1}(1-2\Delta I)$$

$$T_3 = \pi T_2/\cos^{-1}(1-2\Delta I)$$

If the above mentioned relationship is generalized to extend up to PMD monitors of N systems, the following results.

$$T_n = \{\pi/\cos^{-1}(1-2\Delta I)\}^n \cdot \Delta\tau_{max}$$

With such a range where PMD compensation is possible according to the present invention, it can be seen that the range can be exponentially extended corresponding to the system number of PMD monitors. For example, if $\Delta\tau_{max}=0.2T$ (T is 1 time slot) and $\Delta I=0.1$, the upper limit of the range where PMD compensation is possible becomes for example $T_1=0.98T$, $T_2=4.8T$, $T_3=23T$, ..., $T_n=4.88^n \times 0.2T$.

With the PMD compensation apparatus 3 of the third embodiment as described above, feedback control of the PMD compensation amount using three PMD monitors is executed by the control circuit 14'. The specific processing operations of the control circuit 14' for the ¼ wave plate 10a, the ½ wave plate 10b and the optical delay device 11b are the same as for the respective algorithms in the initial setting mode and the tracking mode as described for the case of the first embodiment, and hence description is omitted.

According to such a PMD compensation apparatus 3 of the third embodiment, by using the three PMD monitors 13A through 13C, the range where PMD compensation is possible can be further extended, and to generalize, by using n PMD monitors, the range where PMD compensation is possible can be exponentially extended. With the PMD compensation technique according to the present invention, the frequency differences of a plurality of PMD monitors can be maintained at a maximum. Therefore, compared to the conventional compensation technique, the number of PMD monitors can be made a minimum.

With the above described third embodiment, the description has been for the case where a PMD monitor is added to the configuration of the first embodiment. However, in a similar manner, also in the respective modified examples of the first embodiment, as well as in the second embodiment and the modified example thereof, three or more PMD monitors may be added.

Furthermore, with the above described first through third embodiments, the description has been of the configuration where the respective PMD monitors detect the strength of the frequency components extracted using a band pass filter (BPF). However, the invention is not limited to this, and for example instead of a BPF, a low pass filter (LPF) may be used to detect the strength of the extracted frequency component. With the method for using the LPF, for example, in the case of a sign format where the spectrum of the signal light fluctuate in time-wise, since a value is obtained by integrating the strength of the frequency components over a wide range, more stabilized PMD compensation can be realized compared to the method where a BPF is used for extracting a single frequency component. Furthermore, it is also considered to use the BPF and the LPF together. For example, the BPF may be used as a PMD monitor on the high frequency side, and the LPF may be used as a PMD monitor on the low frequency side. This is because it is considered that, while the baseband signal of the signal light has the high frequency side component stably in time-wise, concerning the long bit pattern corresponding to the low frequency side, the detection frequency is susceptible to time fluctuations. Therefore, there is the advantage that stabilization of the monitor strength can be achieved by using a LPF on the low frequency side.

What is claimed:

1. A method of compensation of polarization-mode dispersion for compensating for influences on signal light due to polarization-mode dispersion of a transmission line, comprising:

a polarization-mode dispersion compensation step for compensating for polarization-mode dispersion occurring in signal light input via a transmission line;

a specific frequency component extraction step for extracting plurality of specific frequency components in a baseband spectrum in the signal light compensated in the polarization-mode dispersion compensation step;

a strength detection step for respectively detecting the strength of each of the specific frequency components extracted in said specific frequency component extraction step; and a compensation condition control step for feedback controlling a polarization-mode dispersion compensation condition in said polarization-mode dispersion compensation step, while sequentially switching the strength of each of the specific frequency components detected in said strength detection step, so that the strength of all of the specific frequency components detected in said strength detection step are within a maximum value convergence range determined in accordance with an indefinite width of the detection sensitivity.

2. A method of compensation of polarization-mode dispersion according to claim 1, wherein said compensation condition control step sequentially performs switching of the strength of the specific frequency components used in feedback control of the polarization-mode dispersion compensation condition so that, after the strength of a specific frequency component on a relatively low frequency side comes within said maximum value convergence range, the strength of a specific frequency component on a relatively high frequency side comes within said maximum value convergence range.

3. An apparatus for compensation of polarization-mode dispersion for compensating for influences on signal light due to polarization-mode dispersion of a transmission line, comprising:

a polarization-mode dispersion compensation section for compensating for polarization-mode dispersion occurring in signal light input via a transmission line;

a specific frequency component extraction section for extracting a plurality of specific frequency components in a baseband spectrum in signal light output from said polarization-mode dispersion compensation section;

a strength detection section for respectively detecting the strength of each of the specific frequency components extracted by said specific frequency component extraction section; and a compensation condition control section for feedback controlling a polarization-mode dispersion compensation condition in said polarization-mode dispersion compensation section, while sequentially switching the strength of each of the specific frequency components detected in said strength detection section, so that the strength of all of the specific frequency components detected by said strength detection section are within a maximum value convergence range determined in accordance with an indefinite width of the detection sensitivity.

4. An apparatus for compensation of polarization-mode dispersion according to claim 3, wherein said compensation condition control section sequentially performs switching of the strength of the specific frequency components used in feedback control of the polarization-mode dispersion compensation condition in said polarization-mode dispersion compensation section so that, after the strength of a specific frequency component on a relatively low frequency side comes within said maximum value convergence range, the strength of a specific frequency component on a relatively high frequency side comes within said maximum value convergence range.

5. An apparatus for compensation of polarization-mode dispersion according to claim 3, wherein said specific frequency component extraction section has a band pass filter having a transmission center frequency corresponding to said specific frequency component, and extracts said specific frequency using said band pass filter.

6. An apparatus for compensation of polarization-mode dispersion according to claim 3, wherein said specific frequency extraction section has a low pass filter having a cutoff frequency corresponding to said specific frequency component, and extracts said specific frequency component using said low pass filter.

7. An apparatus for compensation of polarization-mode dispersion according to claim 3, wherein said polarization-mode dispersion compensation section has a polarization control section for determining a branching ratio for the optical strength to two polarization-modes for said signal light, and an optical delay section for applying an optical delay difference between the two polarization-mode, and a polarization-mode dispersion compensation condition is set corresponding to a combination of the branching ratio of said polarization control section and the optical delay difference of said optical delay section.

8. An apparatus for compensation of polarization-mode dispersion according to claim 7, wherein said polarization-mode dispersion compensation section has a variable optical delay element capable of changing the optical delay difference and a wave plate which changes the state of polarization of the input light to said variable optical delay element, and said compensation condition control section feedback controls at least one of an optical delay amount of the variable optical delay element and a position of said wave plate.

9. An apparatus for compensation of polarization-mode dispersion according to claim 7, wherein said polarization-mode dispersion compensation section has a plurality of polarization-mode dispersion compensation units connected in series, and each of said polarization-mode dispersion compensation units contains a fixed optical delay element which applies a previously set optical delay difference, and a wave plate which changes the state of polarization of the input light to a fixed optical delay element, and said compensation condition control section respectively feedback controls a position of the wave plate of each of said respective polarization-mode dispersion compensation units.

10. An optical transmission system using the polarization-mode dispersion compensation apparatus disclosed in claim 3, wherein said polarization-mode dispersion compensation apparatus is provided along a transmission line connecting between an optical sender and an optical receiver.

11. A method comprising:

compensating for polarization-mode dispersion occurring in signal light;

extracting a plurality of specific frequency components in a baseband spectrum in the compensated signal light;

detecting the respective strength of each of the extracted specific frequency components, said detecting having an indefinite width of detection sensitivity; and feedback controlling a polarization-mode dispersion compensation condition in said compensation, while sequentially switching strength of each of the specific frequency components, so that the detected strength of all of the specific frequency components are within a maximum value convergence range determined in accordance with the indefinite width of the detection sensitivity.

12. A method as in claim 11, wherein said compensating performs the sequential switching of the strength of each specific frequency component so that, after the strength of a specific frequency component on a relatively low frequency side comes within the maximum value convergence range, the strength of a specific frequency component on a relatively high frequency side comes within the maximum value convergence range.

13. An apparatus comprising:
means for compensating for polarization-mode dispersion occurring in signal light;
means for extracting a plurality of specific frequency components in a baseband spectrum in the compensated signal light;
means for detecting the respective strength of each of the extracted specific frequency components, said means for detecting having an indefinite width of detection sensitivity; and
means for feedback controlling a polarization-mode dispersion compensation condition in said means for compensation, while sequentially switching strength of each of the specific frequency components, so that the detected strength of all of the specific frequency components are within a maximum value convergence range determined in accordance with the indefinite width of the detection sensitivity.

14. An apparatus as in claim 13, wherein said means for compensating performs the sequential switching of the strength of each specific frequency component so that, after the strength of a specific frequency component on a relatively low frequency side comes within the maximum value convergence range, the strength of a specific frequency component on a relatively high frequency side comes within the maximum value convergence range.

15. An apparatus comprising:
a compensator compensating for polarization-mode dispersion occurring in signal light;
an extractor extracting a plurality of specific frequency components in a baseband spectrum in the compensated signal light;
a detector detecting the respective strength of each of the extracted specific frequency components, the detector having an indefinite width of detection sensitivity; and
a controller feedback controlling a polarization-mode dispersion compensation condition in the compensator, while sequentially switching strength of each of the specific frequency components, so that the detected strength of all of the specific frequency components are within a maximum value convergence range determined in accordance with the indefinite width of the detection sensitivity.

16. An apparatus as in claim 15, wherein the compensator performs the sequential switching of the strength of each specific frequency component so that, after the strength of a specific frequency component on a relatively low frequency side comes within the maximum value convergence range, the strength of a specific frequency component on a relatively high frequency side comes within the maximum value convergence range.

17. A method of compensation of polarization-mode dispersion for compensating for influences on signal light due to polarization-mode dispersion of a transmission line, comprising:

a polarization-mode dispersion compensation step for compensating for polarization-mode dispersion occurring in signal light input via a transmission line;
a specific frequency component extraction step for extracting a plurality of specific frequency components in a baseband spectrum in the signal light compensated in the polarization-mode dispersion compensation step;
a strength detection step for respectively detecting the strength of each of the specific frequency components extracted in said specific frequency component extraction step; and
a compensation condition control step for feedback controlling a polarization-mode dispersion compensation condition in said polarization-mode dispersion compensation step so that the strength of all of the specific frequency components detected in said strength detection step are within a maximum value convergence range determined in accordance with an indefinite width of the detection sensitivity,
wherein said compensation condition control step sequentially performs switching of the strength of the specific frequency components used in feedback control of the polarization-mode dispersion compensation condition so that, after the strength of a specific frequency component on a relatively low frequency side comes within said maximum value convergence range, the strength of a specific frequency component on a relatively high frequency side comes within said maximum value convergence range.

18. An apparatus for compensation of polarization-mode dispersion for compensating for influences on signal light due to polarization-mode dispersion of a transmission line, comprising:
a polarization-mode dispersion compensation section for compensating for polarization-mode dispersion occurring in signal light input via a transmission line;
a specific frequency component extraction section for extracting a plurality of specific frequency components in a baseband spectrum in signal light output from said polarization-mode dispersion compensation section;
a strength detection section for respectively detecting the strength of each of the specific frequency components extracted by said specific frequency component extraction section; and
a compensation condition control section for feedback controlling a polarization-mode dispersion compensation condition in said polarization-mode dispersion compensation section so that the strength of all of the specific frequency components detected by said strength detection section are within a maximum value convergence range determined in accordance with an indefinite width of the detection sensitivity,
wherein said compensation condition control section sequentially performs switching of the strength of the specific frequency components used in feedback control of the polarization-mode dispersion compensation condition in said polarization-mode dispersion compensation section so that, after the strength of a specific frequency component on a relatively low frequency side comes within said maximum value convergence range, the strength of a specific frequency component on a relatively high frequency side comes within said maximum value convergence range.

19. An apparatus for compensation of polarization-mode dispersion for compensating for influences on signal light due to polarization-mode dispersion of a transmission line, comprising:

a polarization-mode dispersion compensation section for compensating for polarization-mode dispersion occurring in signal light input via a transmission line;

a specific frequency component extraction section for extracting a plurality of specific frequency components in a baseband spectrum in signal light output from said polarization-mode dispersion compensation section;

a strength detection section for respectively detecting the strength of each of the specific frequency components extracted by said specific frequency component extraction section; and a compensation condition control section for feedback controlling a polarization-mode dispersion compensation condition in said polarization-mode dispersion compensation section so that the strength of all of the specific frequency components detected by said strength detection section are within a maximum value convergence range determined in accordance with an indefinite width of the detection sensitivity, wherein said polarization-mode dispersion compensation section has a polarization control section for determining a branching ratio for the optical strength to two polarization-modes for said signal light, and an optical delay section for applying an optical delay difference between the two polarization-modes, and a polarization-mode dispersion compensation condition is set corresponding to a combination of the branching ratio of said polarization control section and the optical delay difference of said optical delay section.

20. An apparatus for compensation of polarization-mode dispersion according to claim 19, wherein said polarization-mode dispersion compensation section has a variable optical delay element capable of changing the optical delay difference and a wave plate which changes the state of polarization of the input light to said variable optical delay element, and said compensation condition control section feedback controls at least one of an optical delay amount of the variable optical delay element and a position of said wave plate.

21. An apparatus for compensation of polarization-mode dispersion according to claim 19, wherein said polarization-mode dispersion compensation section has a plurality of polarization-mode dispersion compensation units connected in series, and each of said polarization-mode dispersion compensation units contains a fixed optical delay element which applies a previously set optical delay difference, and a wave plate which changes the state of polarization of the input light to a fixed optical delay element, and said compensation condition control section respectively feedback controls a position of the wave plate of each of said respective polarization-mode dispersion compensation units.

* * * * *

UNITED STATES PATENT AND TRADEMARK OFFICE
CERTIFICATE OF CORRECTION

PATENT NO.    : 6,829,440 B2
DATED         : December 7, 2004
INVENTOR(S)   : Hiroki Ooi et al.

It is certified that error appears in the above-identified patent and that said Letters Patent is hereby corrected as shown below:

<u>Title page,</u>
Item [56], References Cited, OTHER PUBLICATIONS, "Hiroki, Ooi et al." reference, please change "Gbits/s" to -- Gbit/s --.

<u>Column 24,</u>
Line 24, change "mode" to -- modes --.

<u>Column 28,</u>
Line 15, please insert a space after "claim 19,".

Signed and Sealed this

Twenty-eighth Day of June, 2005

JON W. DUDAS
*Director of the United States Patent and Trademark Office*